(12) United States Patent
Seung et al.

(10) Patent No.: US 11,628,932 B2
(45) Date of Patent: Apr. 18, 2023

(54) MULTICOPTER

(71) Applicant: DOOSAN MOBILITY INNOVATION INC., Yongin-si (KR)

(72) Inventors: Myeong Hun Seung, Incheon (KR); Woo Tae Cheon, Sejong-si (KR); Dae Gone Nam, Seongnam-si (KR); Han Kyun Jeong, Yongin-si (KR)

(73) Assignee: DOOSAN MOBILITY INNOVATION INC., Yongin (KR)

( * ) Notice: Subject to any disclaimer, the term of this patent is extended or adjusted under 35 U.S.C. 154(b) by 386 days.

(21) Appl. No.: 16/990,299

(22) Filed: Aug. 11, 2020

(65) Prior Publication Data

US 2021/0107636 A1 Apr. 15, 2021

Related U.S. Application Data

(60) Provisional application No. 62/886,327, filed on Aug. 13, 2019.

(30) Foreign Application Priority Data

May 8, 2020 (KR) ........................ 10-2020-0055402

(51) Int. Cl.
*B64C 27/08* (2023.01)
*B64C 1/30* (2006.01)
*B64C 39/02* (2023.01)
*B64U 10/13* (2023.01)

(52) U.S. Cl.
CPC ................ *B64C 27/08* (2013.01); *B64C 1/30* (2013.01); *B64C 39/024* (2013.01); *B64U 10/13* (2023.01)

(58) Field of Classification Search
CPC ......... B64C 27/08; B64C 1/30; B64C 39/024; B64C 2201/027; B64C 2211/00; B64U 10/13

See application file for complete search history.

(56) References Cited

U.S. PATENT DOCUMENTS

| | | | | |
|---|---|---|---|---|
| 9,914,537 B2* | 3/2018 | Wu | ........................ | B64D 47/08 |
| 10,202,191 B2* | 2/2019 | Wu | ......................... | B64C 27/12 |
| 10,472,063 B2* | 11/2019 | Wu | ........................ | B64C 39/024 |
| 10,543,918 B1* | 1/2020 | Kimchi | .................. | B64C 39/024 |
| 10,780,988 B2* | 9/2020 | Buchmueller | .......... | B64C 39/02 |
| 10,787,249 B2* | 9/2020 | Oberndorfer | ........... | B64C 25/62 |
| 10,946,959 B2* | 3/2021 | Nwosu | .................... | B64D 27/24 |
| 11,091,262 B2* | 8/2021 | Wu | ........................ | B64D 47/08 |
| 11,361,655 B2* | 6/2022 | Li | ............................. | G06T 7/74 |

(Continued)

FOREIGN PATENT DOCUMENTS

| | | |
|---|---|---|
| EP | 2230743 A2 | 9/2010 |
| JP | 2018516197 A | 6/2018 |
| JP | 6614556 B2 | 12/2019 |

OTHER PUBLICATIONS

International Search Report dated Jul. 20, 2021.
KR Office Action dated Apr. 14, 2021.

*Primary Examiner* — Medhat Badawi
(74) *Attorney, Agent, or Firm* — Harvest IP Law LLP

(57) ABSTRACT

A multicopter is provided. The multicopter may include a main body part, a wing part having one end connected to the main body part, and the other end connected to a propeller assembly, and a foldable part disposed on the wing part to fold the wing part, wherein the wing part is located above the main body part with respect to a Z-axis.

25 Claims, 22 Drawing Sheets

(56) References Cited

U.S. PATENT DOCUMENTS

| | | | |
|---|---|---|---|
| 2010/0231042 A1* | 9/2010 | Weale | H02J 13/00028 |
| | | | 307/38 |
| 2015/0012154 A1* | 1/2015 | Senkel | B64C 27/473 |
| | | | 701/4 |
| 2016/0144957 A1* | 5/2016 | Claridge | B64C 29/02 |
| | | | 244/6 |
| 2017/0043870 A1* | 2/2017 | Wu | B64D 47/08 |
| 2017/0247098 A1* | 8/2017 | Sanlaville | B64C 39/024 |
| 2017/0320570 A1* | 11/2017 | Horn | B64C 39/024 |
| 2018/0127091 A1* | 5/2018 | Del Castillo | B64D 1/02 |
| 2018/0170541 A1* | 6/2018 | Wu | B64C 27/08 |
| 2018/0273158 A1* | 9/2018 | Courtin | B64C 39/024 |
| 2019/0152599 A1* | 5/2019 | Wu | B64C 39/024 |
| 2019/0222159 A1* | 7/2019 | Kuroki | H02J 7/04 |
| 2020/0062383 A1* | 2/2020 | Kim | B64C 3/385 |
| 2020/0094960 A1* | 3/2020 | Wu | B64C 39/024 |
| 2020/0307407 A1* | 10/2020 | Fischer | B64F 1/362 |
| 2021/0107636 A1* | 4/2021 | Seung | B64C 27/08 |
| 2021/0323668 A1* | 10/2021 | Seung | H01M 16/006 |
| 2021/0380238 A1* | 12/2021 | Wu | B64C 27/12 |
| 2022/0219815 A1* | 7/2022 | Ciripompa | B64C 27/72 |
| 2022/0247347 A1* | 8/2022 | Gavrilov | B08B 3/024 |

\* cited by examiner

[FIG. 1]
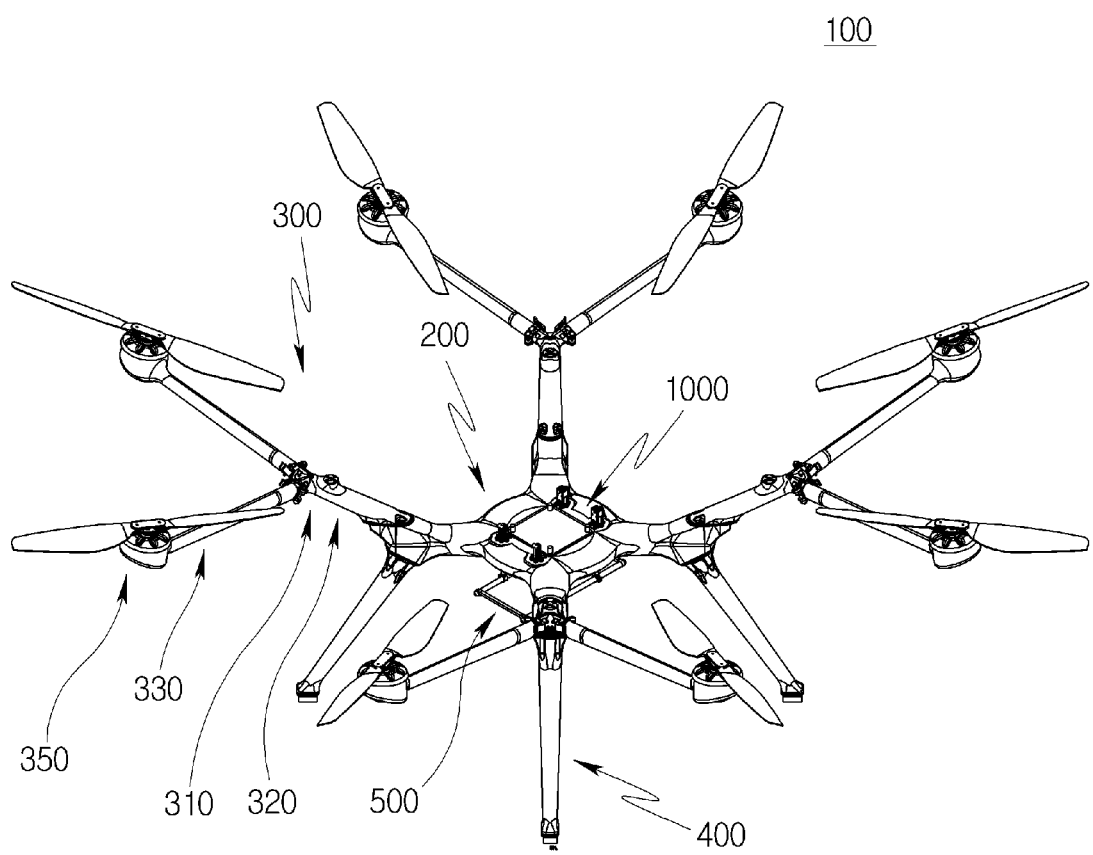

[FIG. 2]
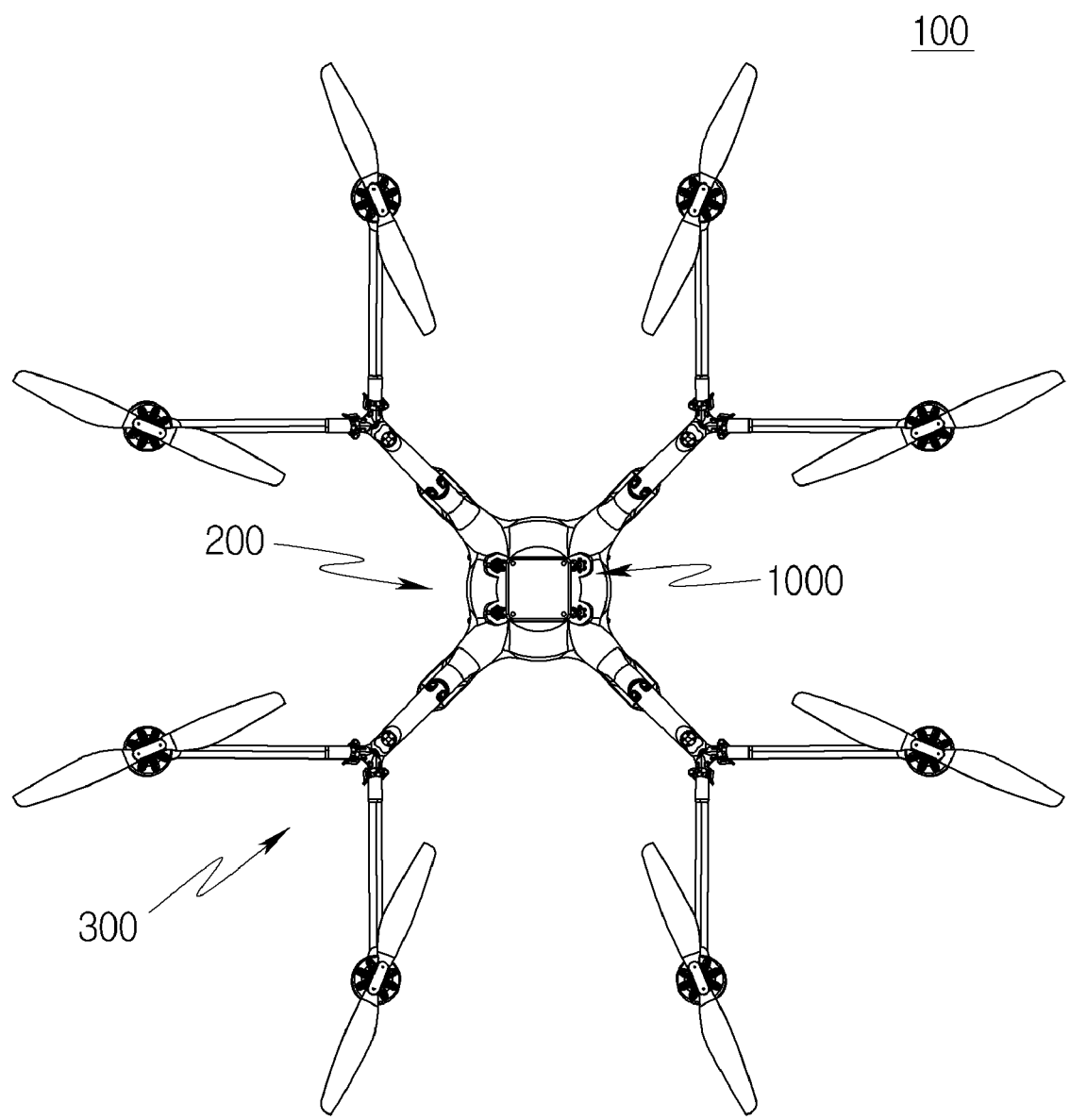

[FIG. 3]
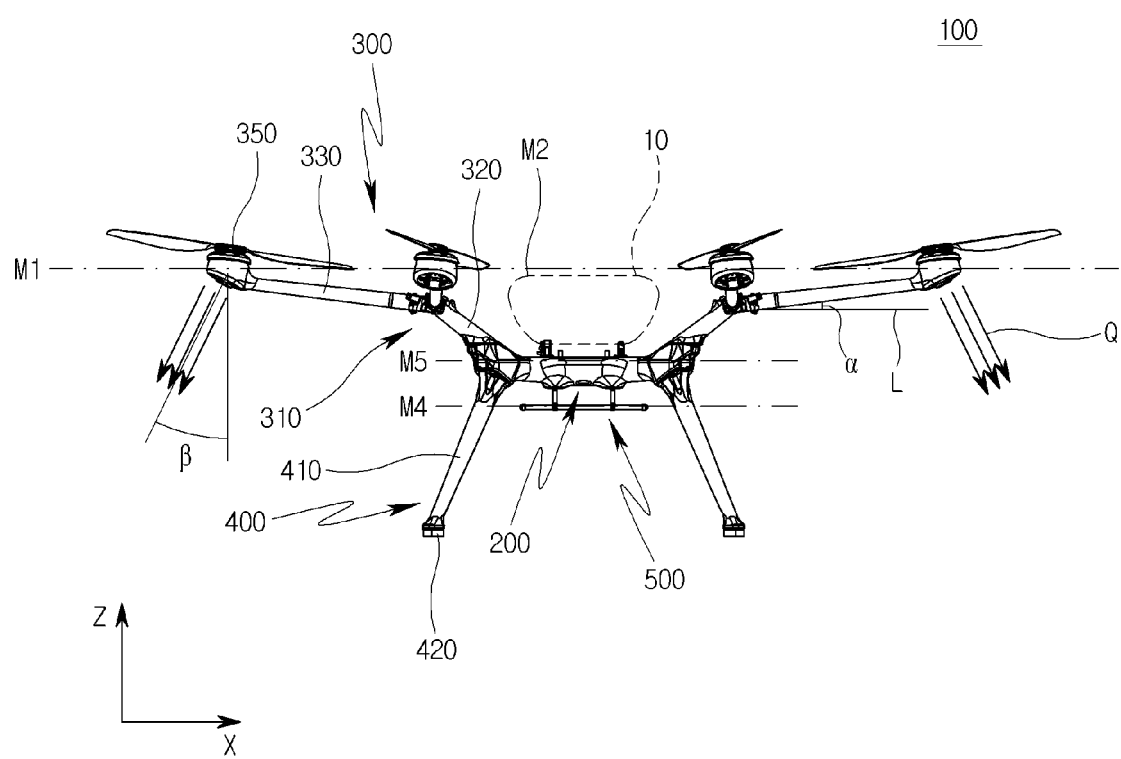

[FIG. 4]
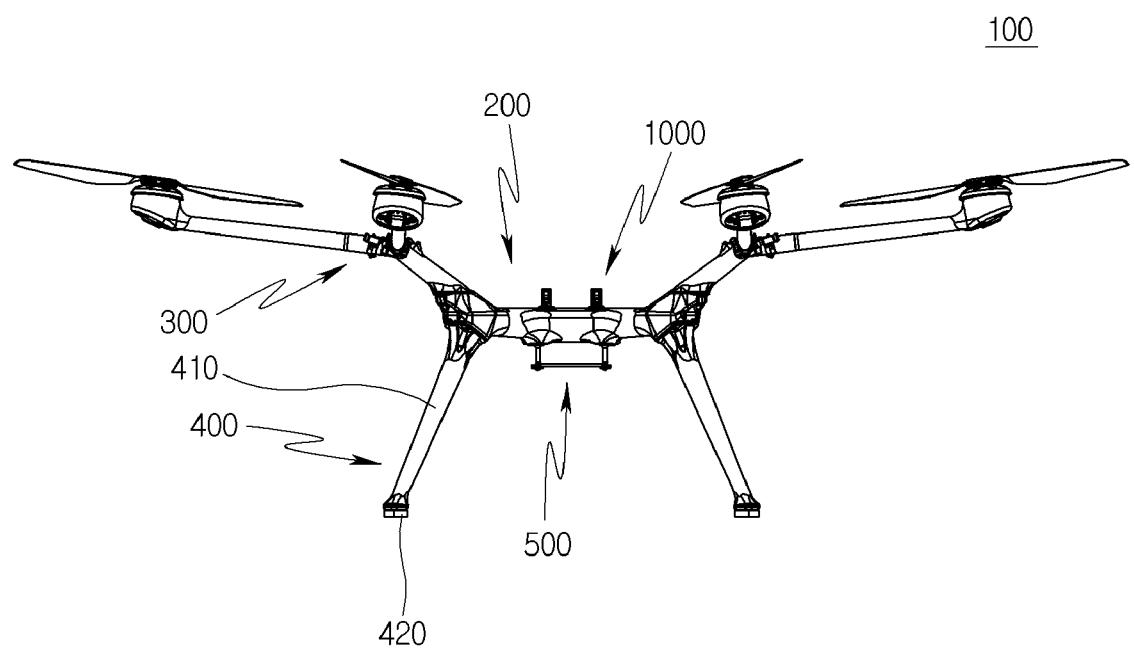

[FIG. 5]
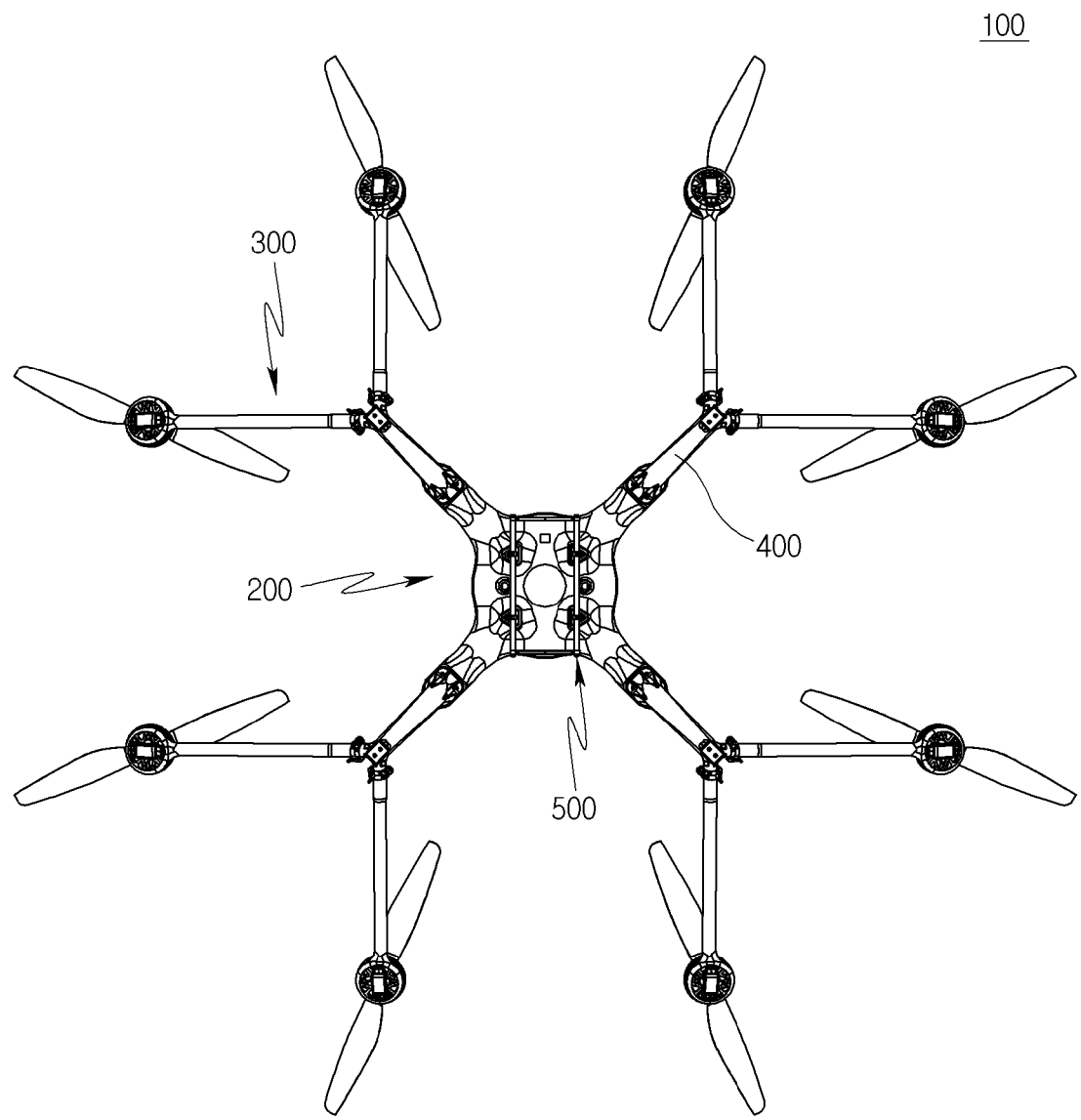

[FIG. 6]
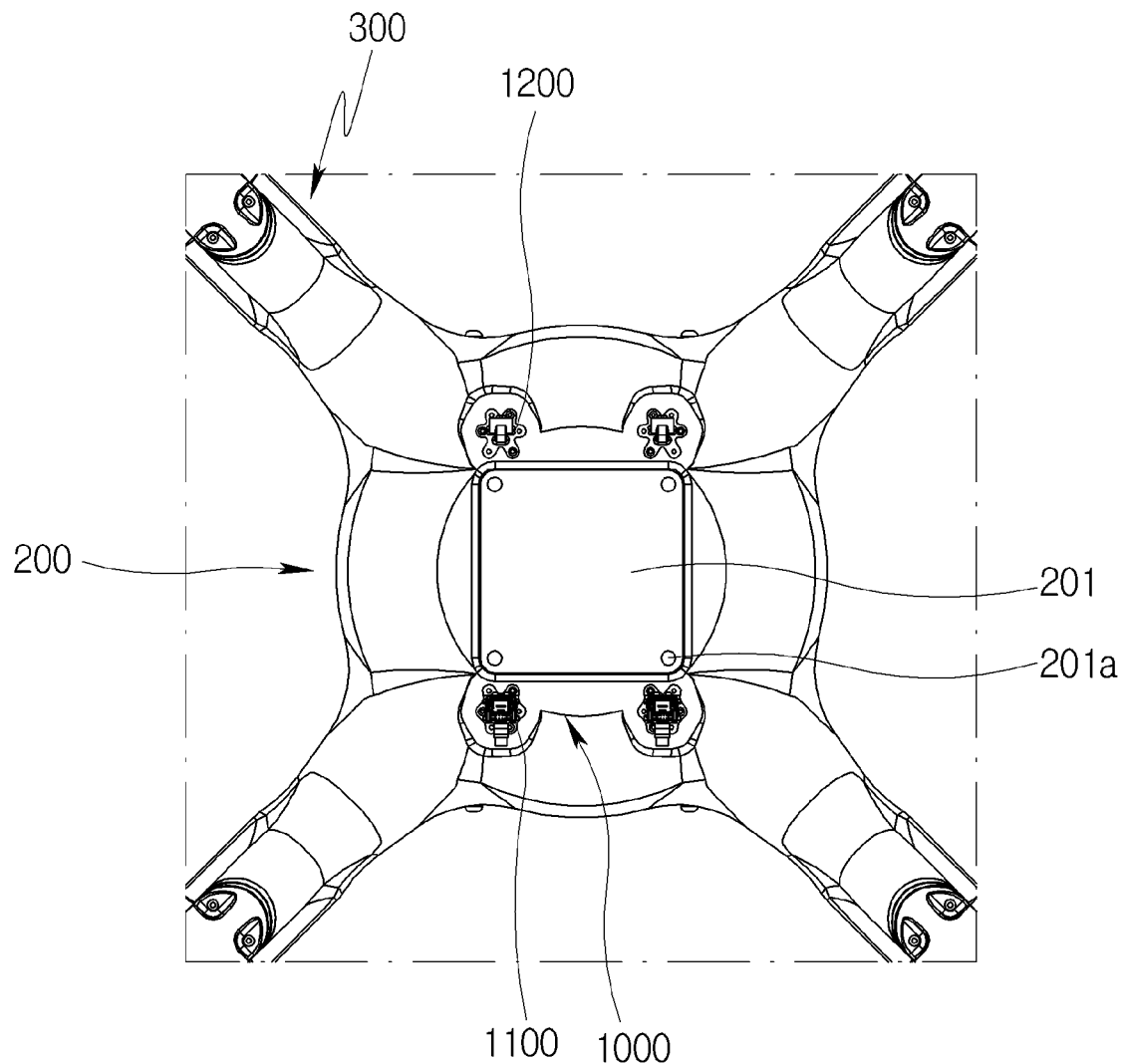

[FIG. 7]
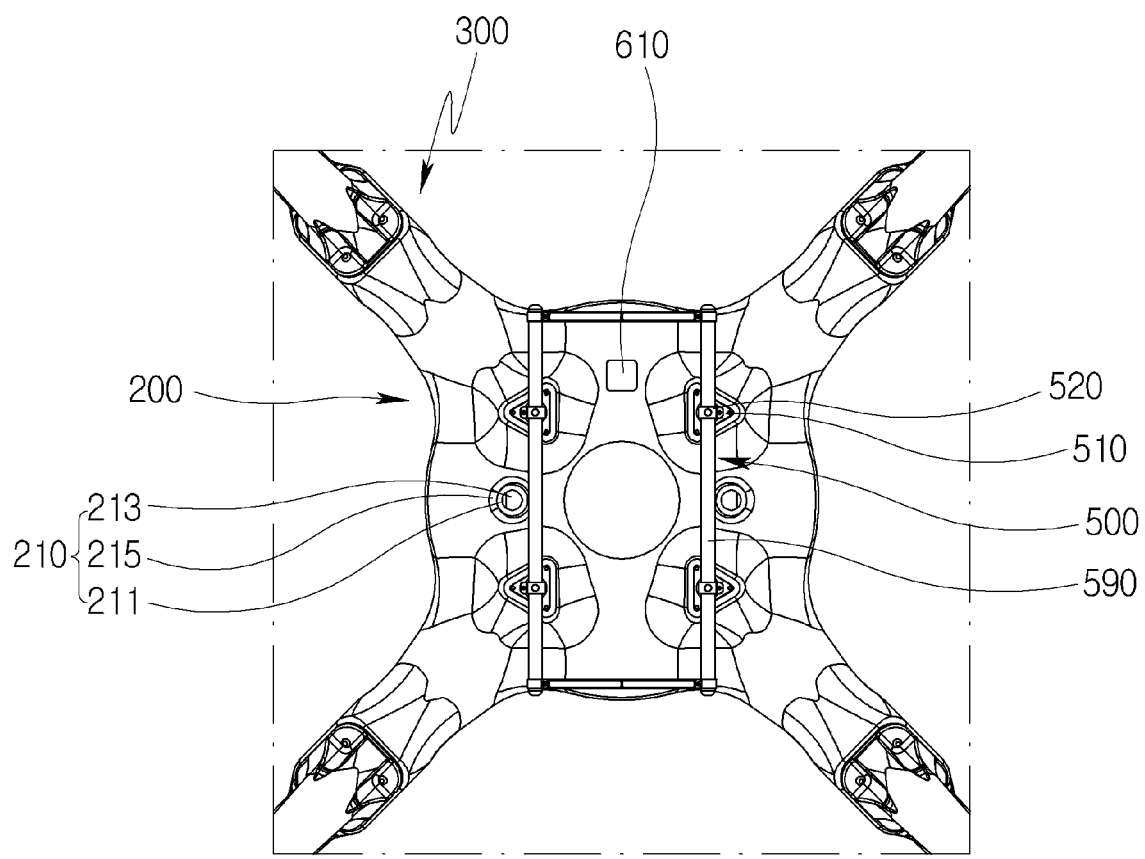

[FIG. 8]
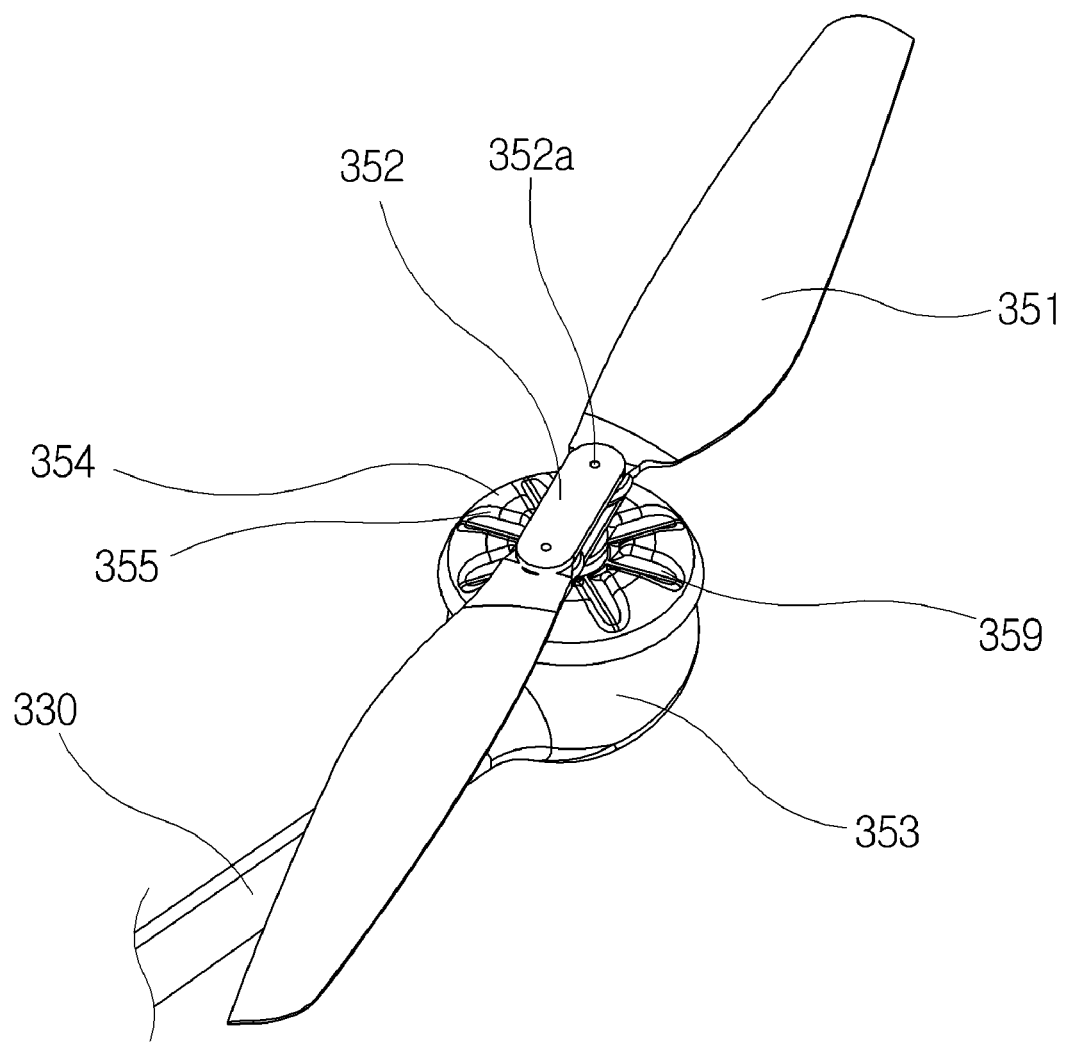

[FIG. 9]
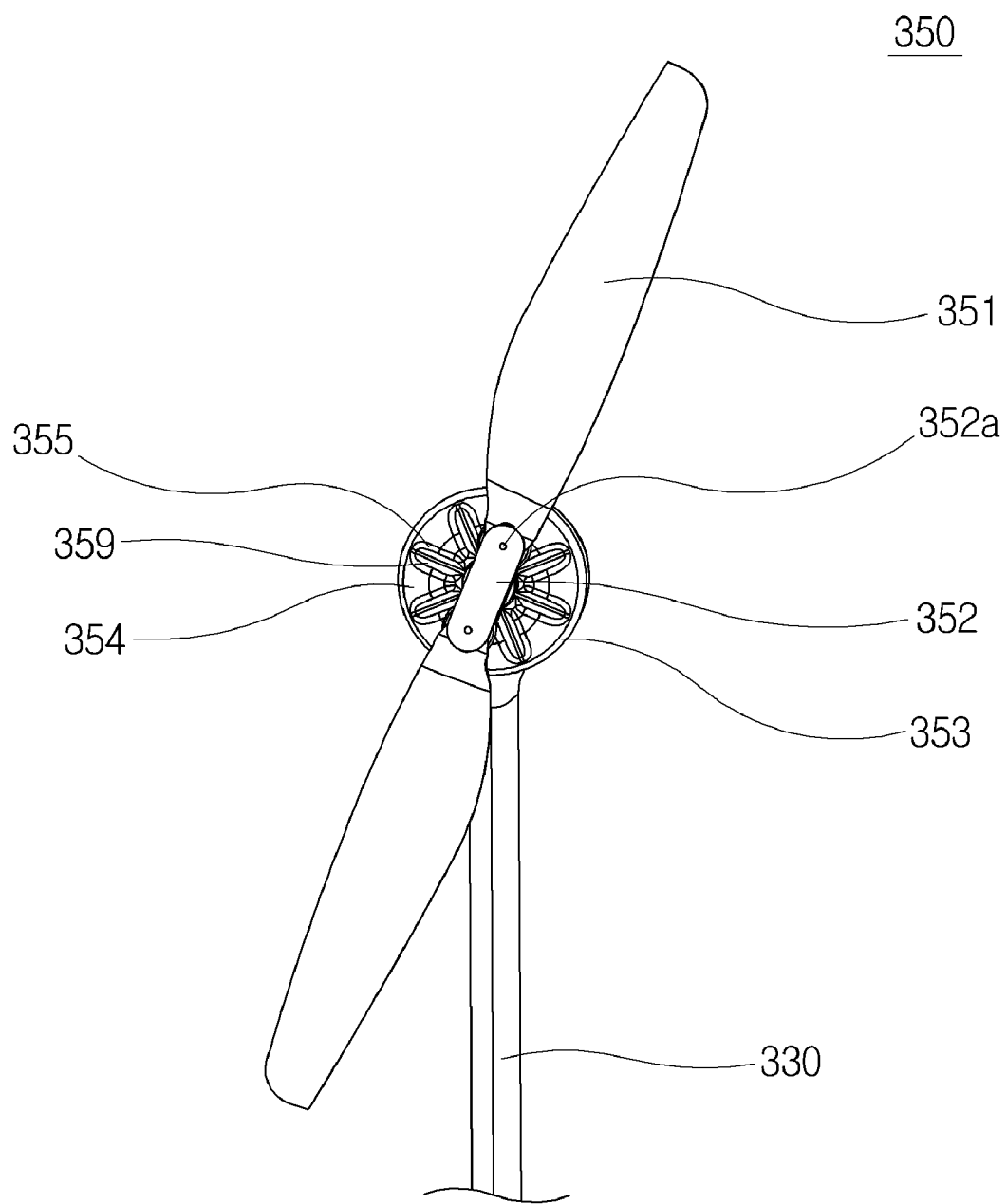

[FIG. 10]
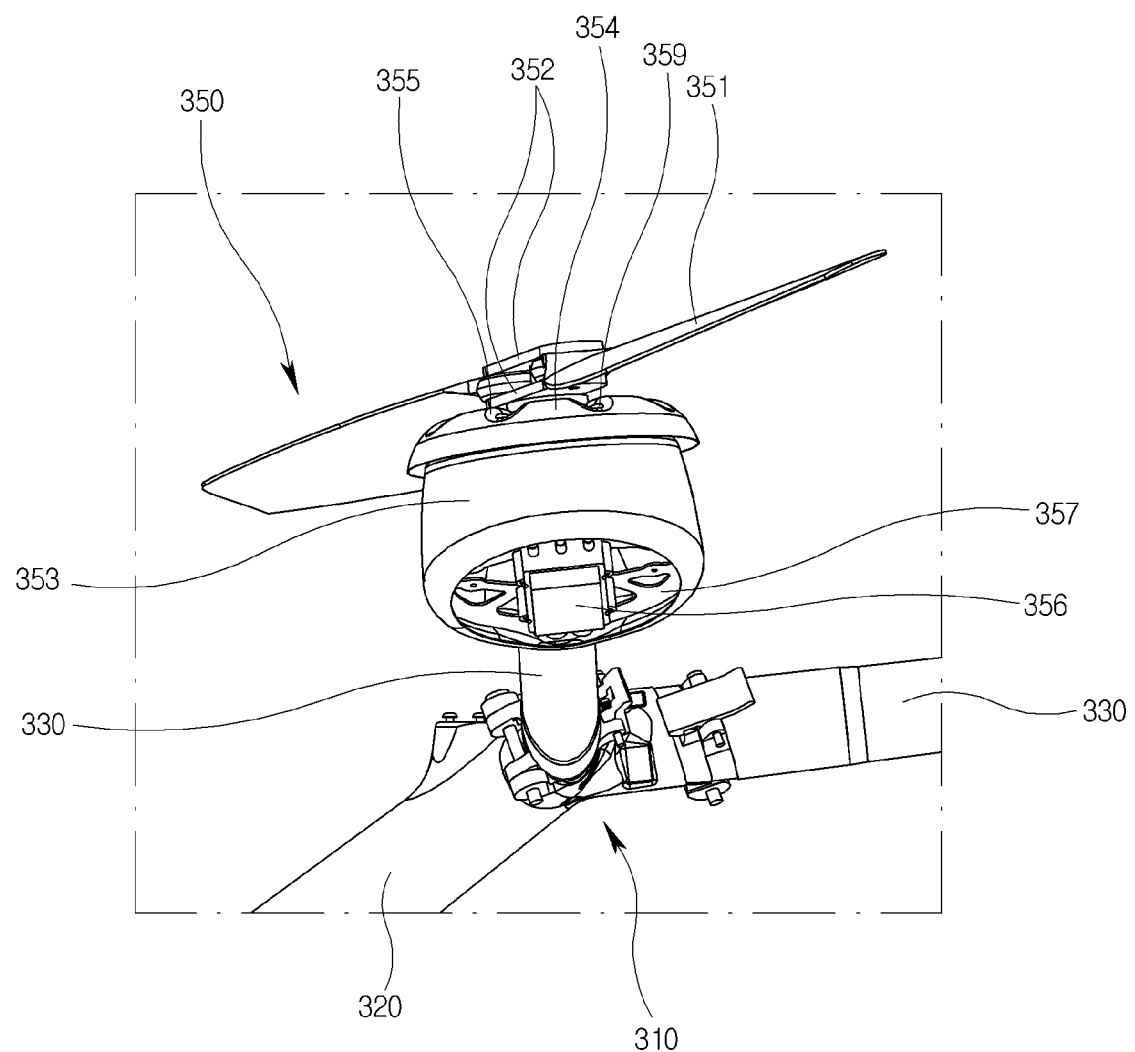

[FIG. 11]
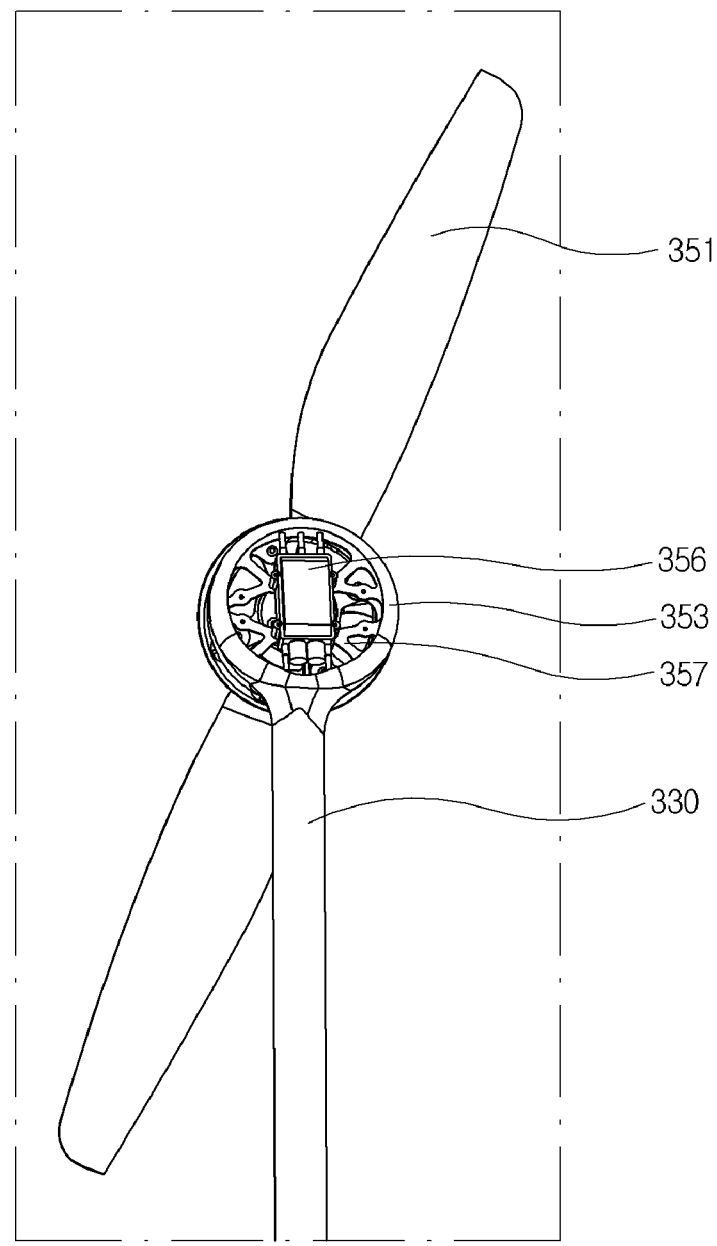

[FIG. 12]
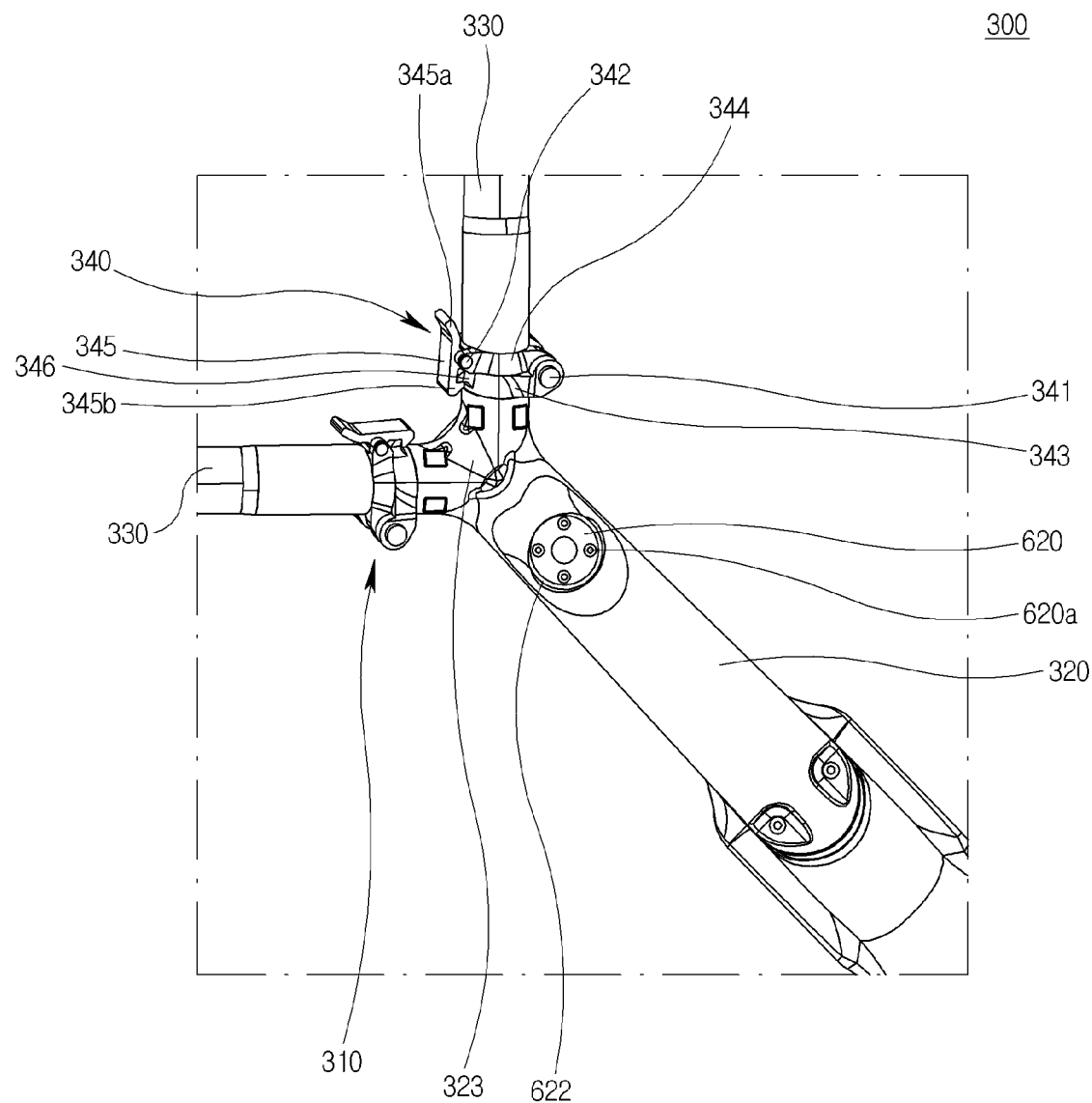

[FIG. 13]
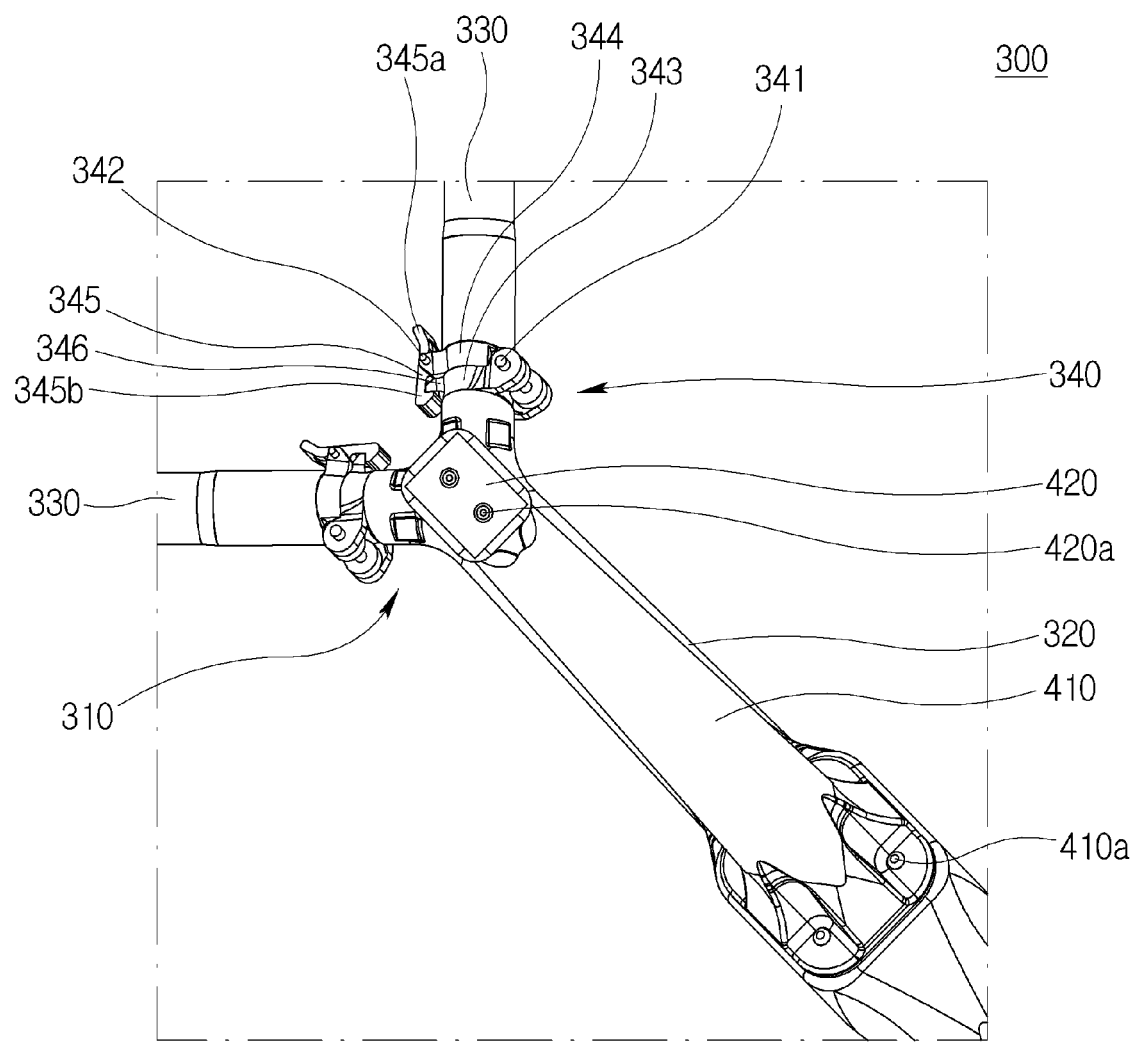

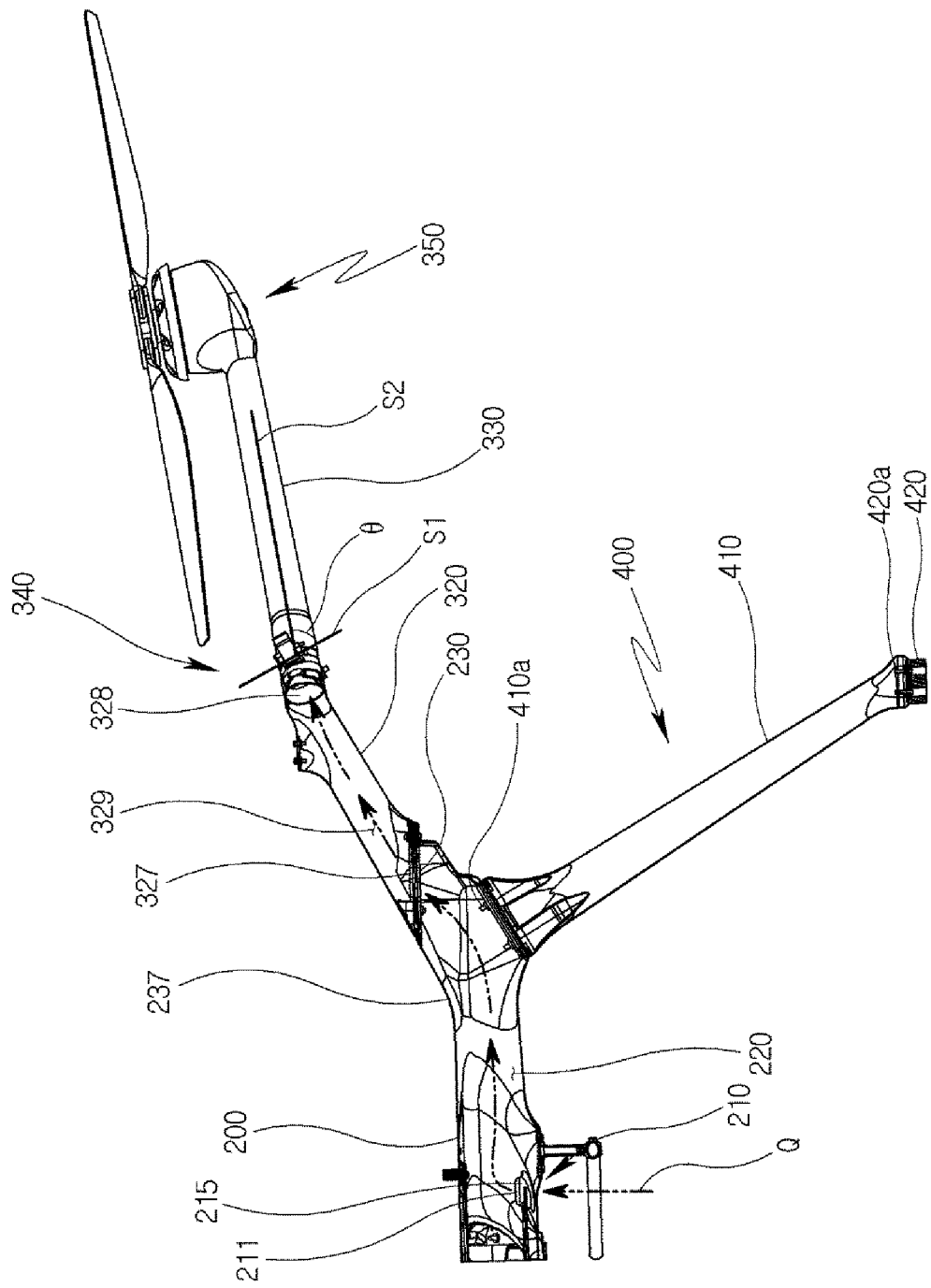
[FIG. 14]

[FIG. 15]
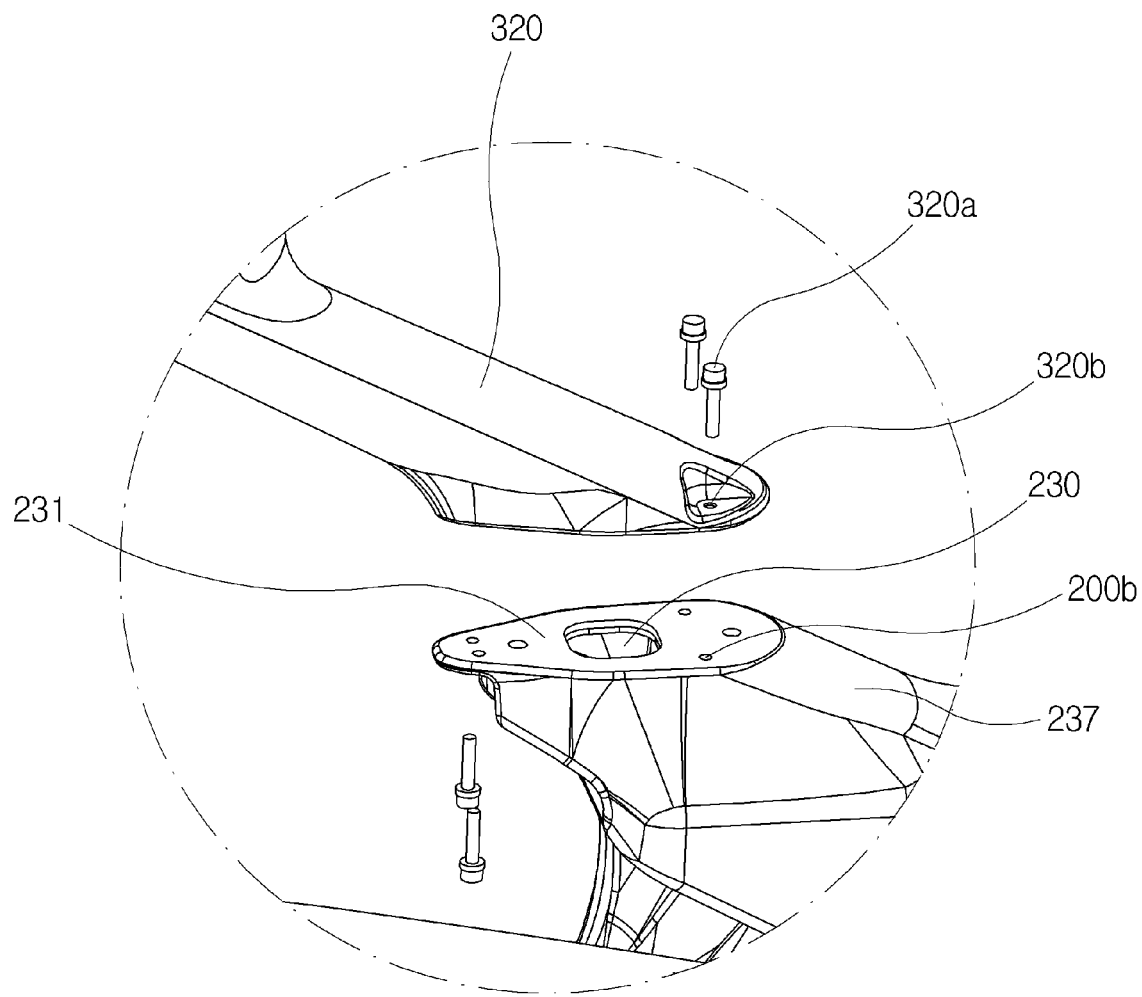

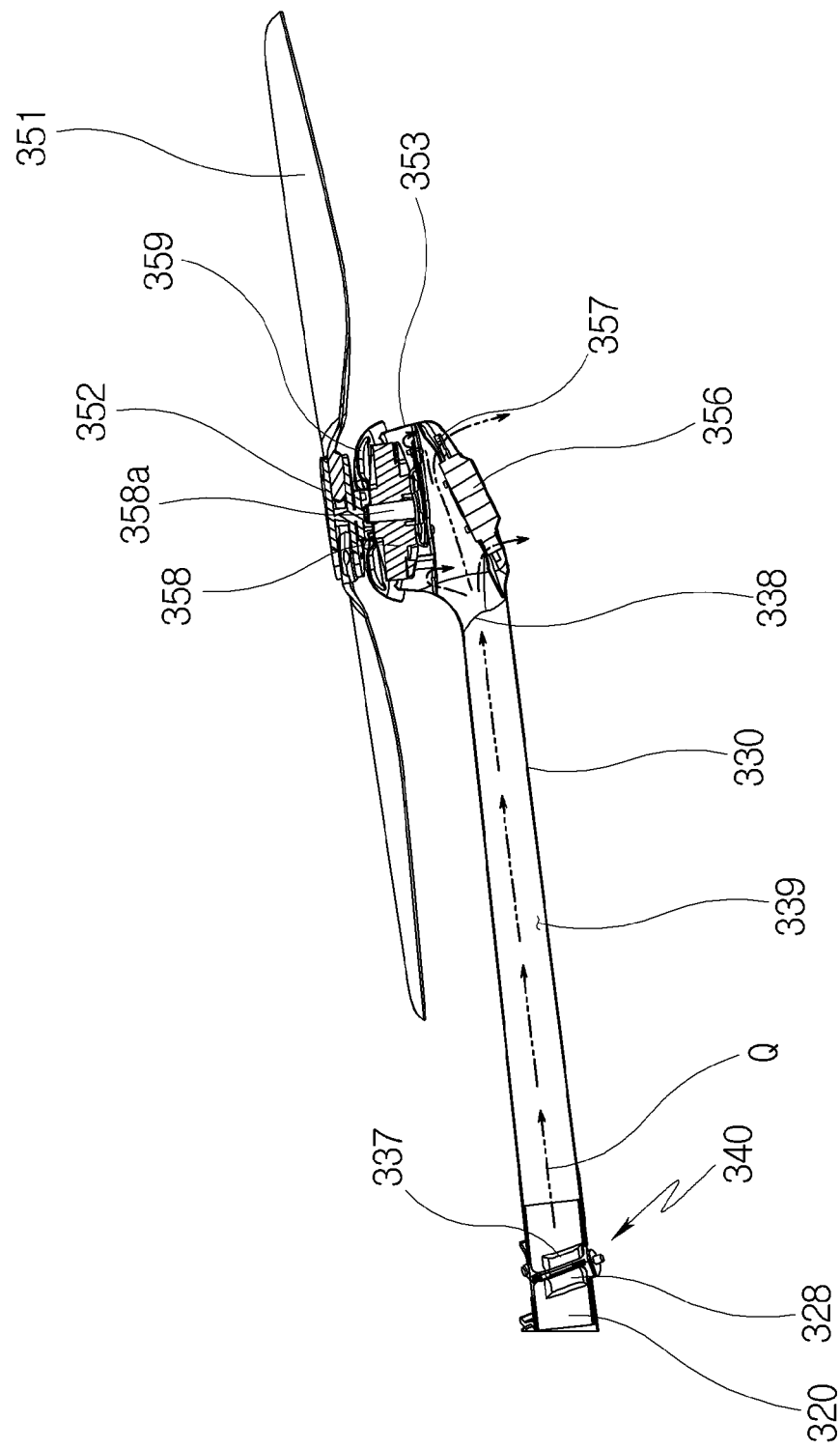
[FIG. 16]

[FIG. 17]
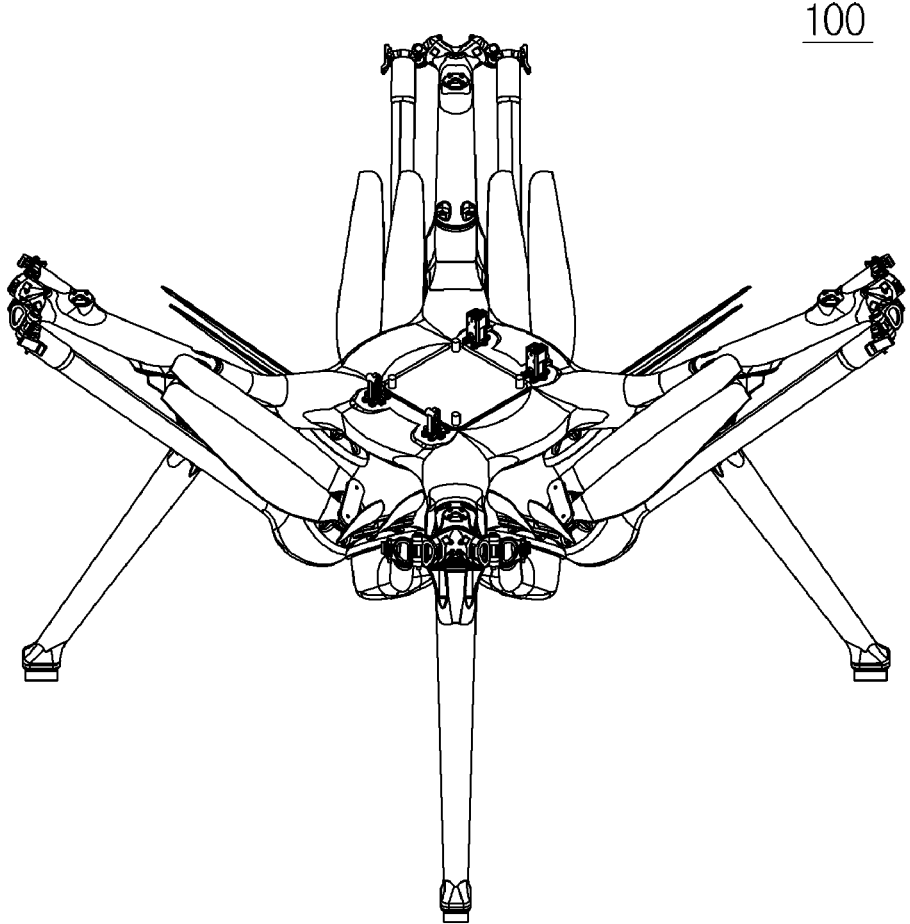

[FIG. 18]
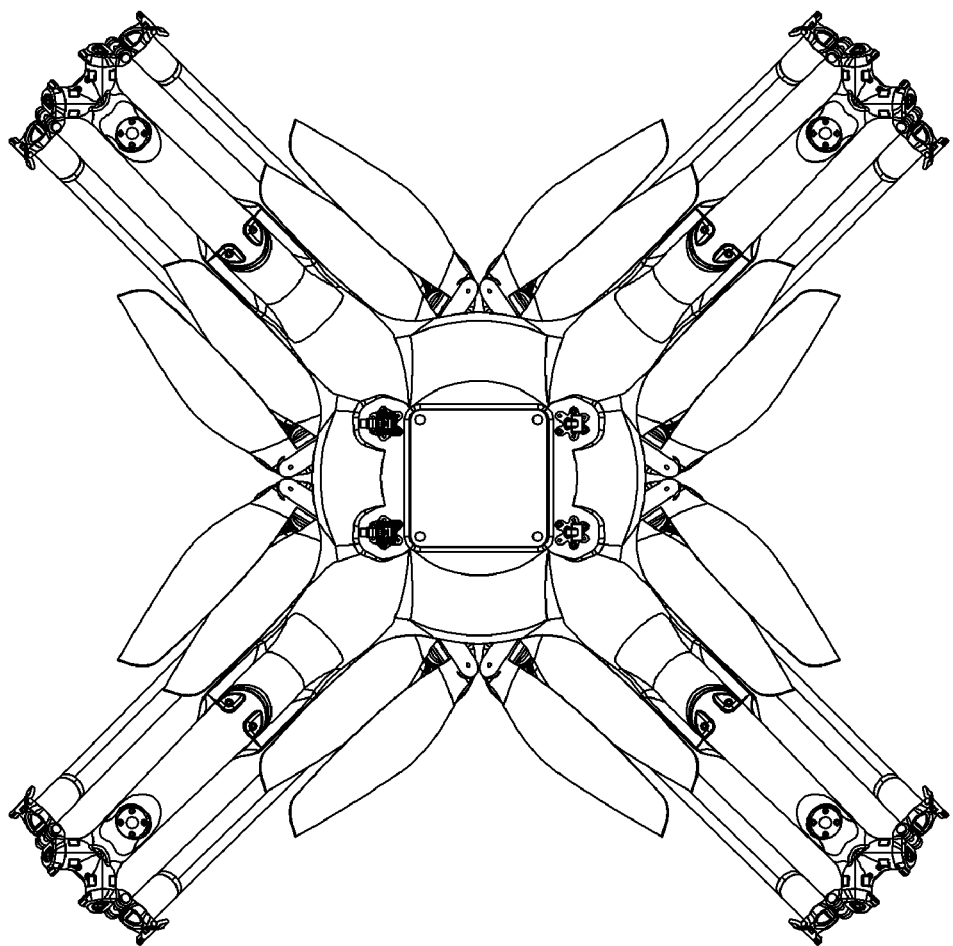

[FIG. 19]
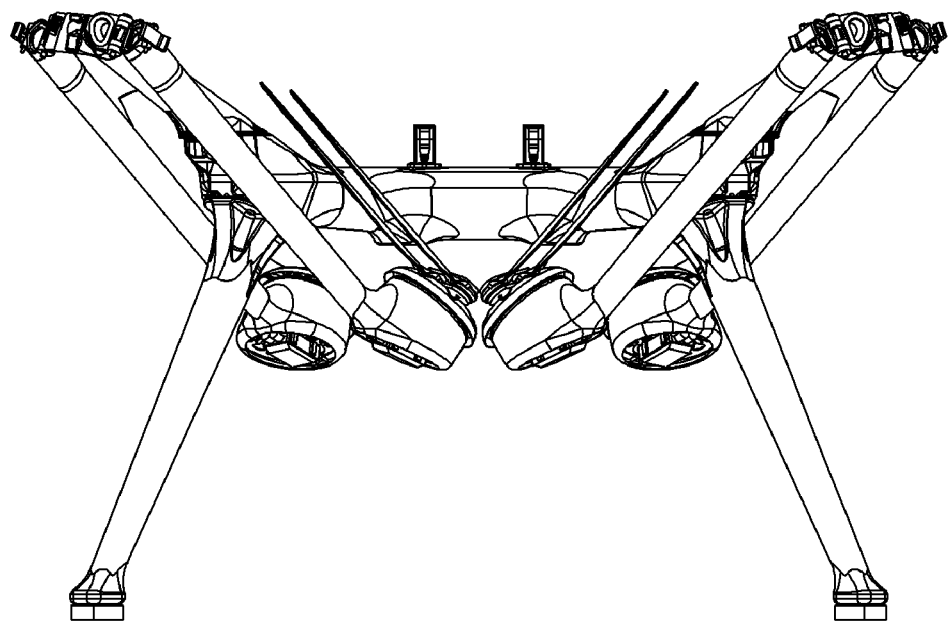

[FIG. 20]
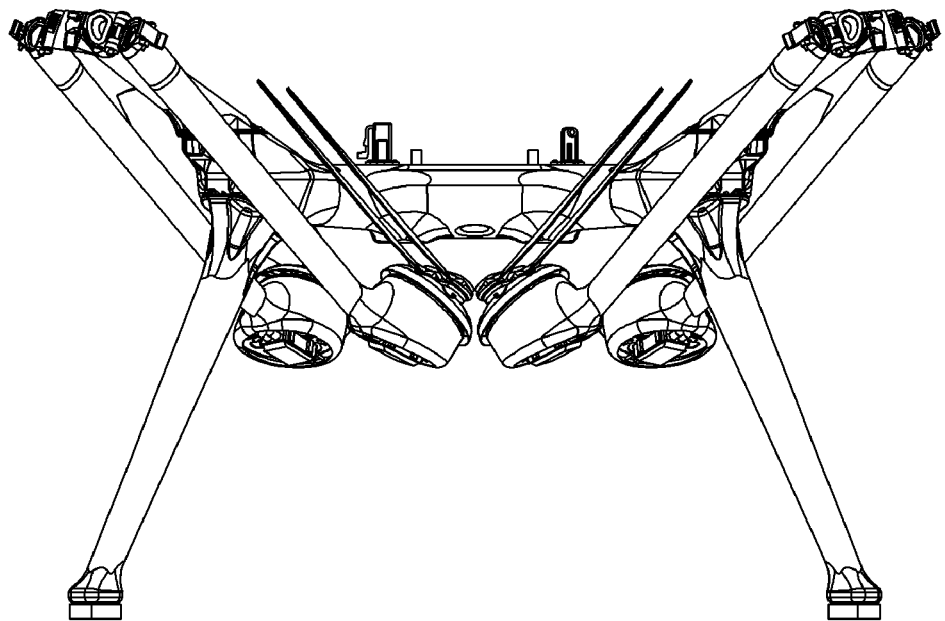

[FIG. 21]
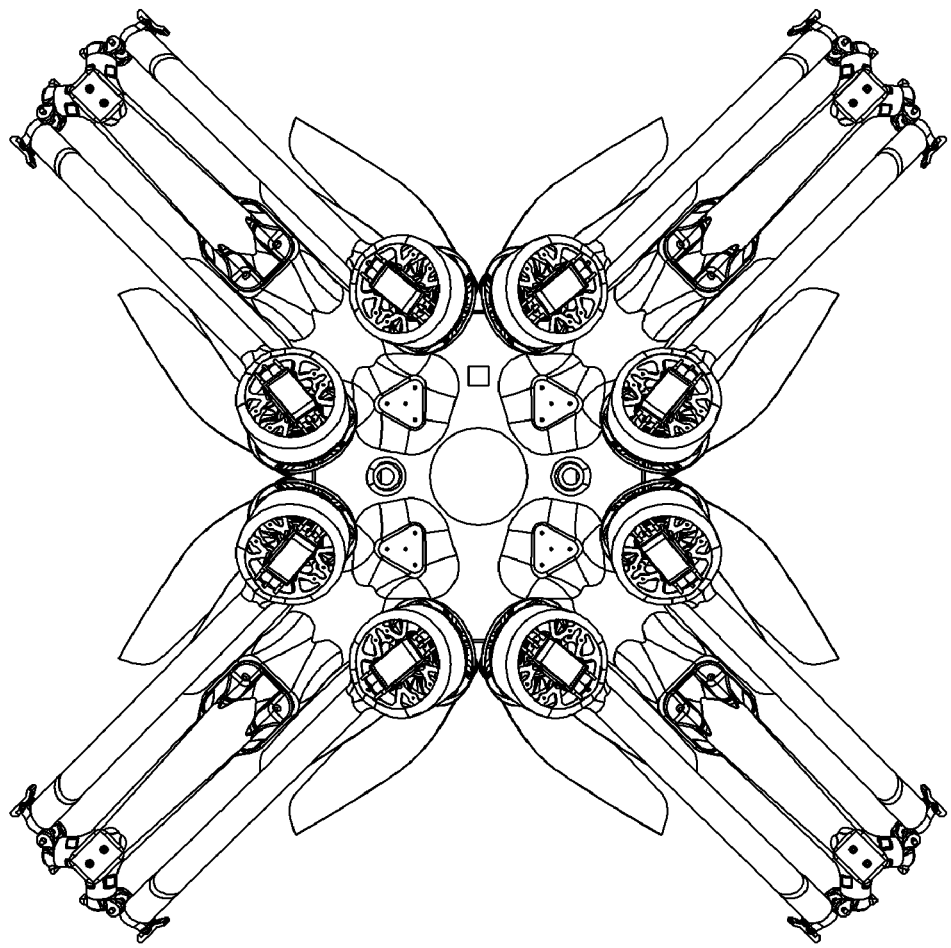

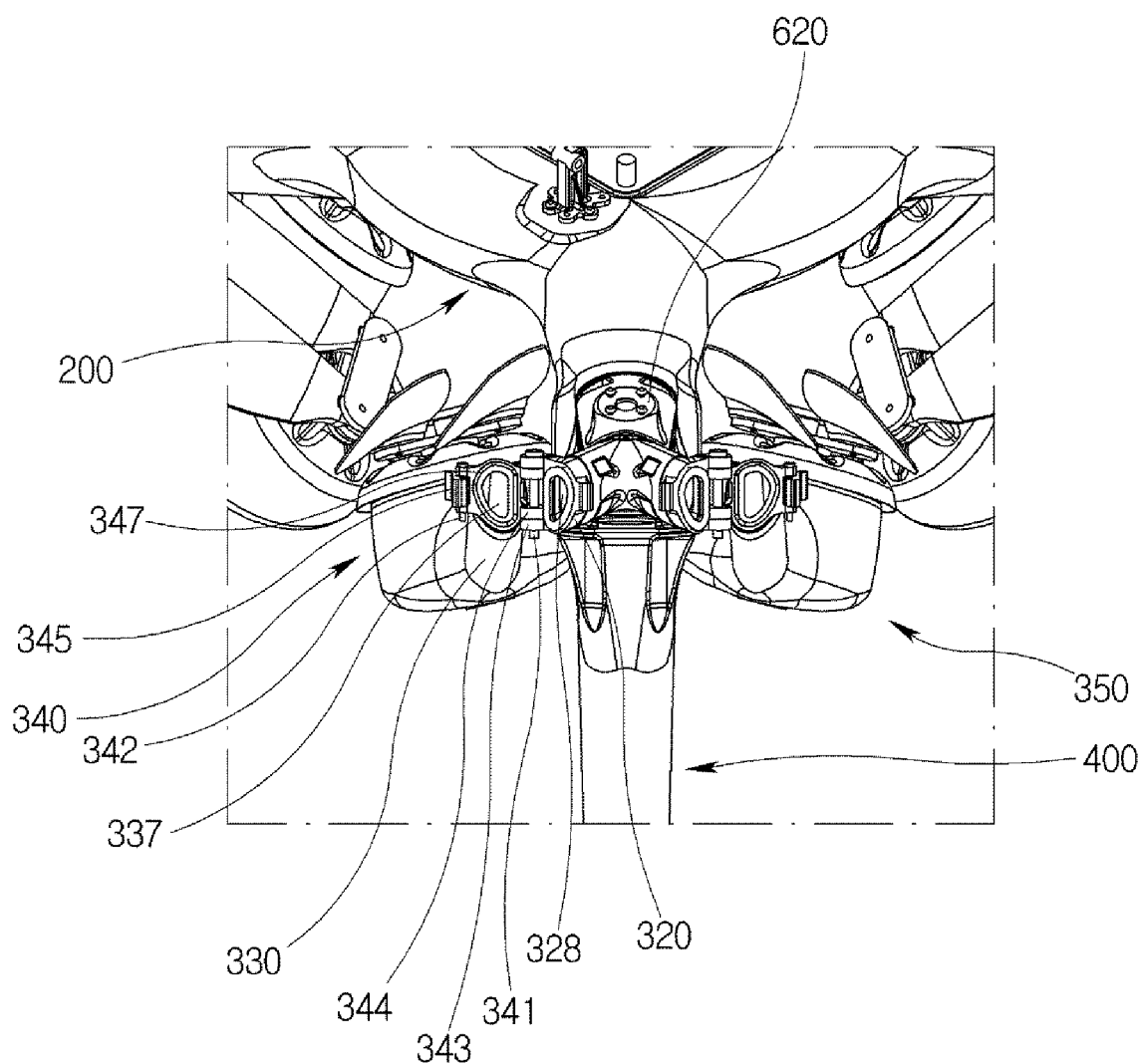
[FIG. 22]

MULTICOPTER

CROSS-REFERENCE TO RELATED APPLICATIONS

This application claims priority to U.S. Provisional Patent Application No. 62/886,327 filed on Aug. 13, 2019 in the U.S. Patent and Trademark Office, and Korean Patent Application No. 10-2020-0055402, filed on May 8, 2020 in the Korean Intellectual Property Office, the disclosures of which are incorporated herein by reference in their entireties.

BACKGROUND

Field

The disclosure relates to a multicopter, and more particularly, to a multicopter which may implement a foldable propeller structure and a simple disassembly structure of respective components, thereby facilitating size reduction, disassembly/assembly, and transport/storage, and may operate in conjunction with next-generation high-efficiency power sources such as lithium-ion batteries and fuel cell power packs, thereby improving a payload value for heavy cargo, enabling a long-time flight, and the like.

The disclosure also relates to a multicopter which may be configured to allow a propeller to be located above a power source when the propeller is unfolded, thereby removing an obstacle in an air inflow path above the propeller to improve aerodynamic efficiency, and allow the propeller to deviate from a flow range around the power source upon cruising, thereby improving aerodynamic efficiency and control stability even upon cruising.

Description of the Related Art

A multicopter is an aircraft flying in the sky using multiple rotating wings. Recently, the multicopter has been used in a similar sense to a drone.

Here, the drone is a generic term for an unmanned aerial vehicle. The drone controlled by a radio wave was initially used for militarily to practice intercepting an air force aircraft, anti-aircraft guns or missiles.

As a wireless technology gradually develops, the multicopter has been used not only for practicing interception simply but also for destroying target facilities by being mounted on a military reconnaissance aircraft or mounted with various weapons thereon.

An attack drone has a shape similar to a fighter. The attack drone has a form in which a pair of large lift wings disposed on an intermediate portion of a body in both directions and a pair of tail wings controlling a direction of the drone instead of a propeller are disposed like a general fighter.

Further, it is understood that there is a form which has a plurality of propellers, radially disposed and operated in a free direction like a multicopter among the attack drones.

The wing or multicopter type drones are used for a purpose such as reconnaissance or bombing.

In recent years, the utilization of drones has increased. Small drones have been developed and used for leisure purposes, and a popularization of drones is gradually expanding to an extent that drone control competitions are held. In addition, a delivery industry is also planning and implementing a delivery mechanism which transports ordered goods using the drones.

In line with this trend, major companies around the world regard drone-related industries as a promising new business and devote themselves to investment activities and technology development.

However, there are several things which are important in operating the multicopter type drone.

First, because a plurality of propellers are disposed in a radial direction, a region occupying a space is large. For example, because the multicopter which transports heavy cargo is large in size, the propeller itself is also required to be large to lift the multicopter and the heavy cargo. Accordingly, upon non-operation, a structural design which is easy to store and transport is required.

Next, when the multicopter itself or the heavy cargo is to be transported, there is a concern as to whether a payload value of the heavy cargo may be handled and a long flight may be performed. A weight of a battery is also a problem in a case of the related art power source such as a normal battery, but there may occur a problem in that the payload value of the heavy cargo is not handled and thus the multicopter may not take off, and even if the multicopter takes off, there is a concern that a long-term flight capable of transporting cargo to a destination is possible. Accordingly, a stable connection structure with the power source that sufficiently handles the payload value of the heavy cargo and enables the long-time flight is required.

In addition, when the power source is connected to the multicopter, a location of an overall center of gravity formed by the multicopter, the power source, and the heavy cargo is a key point so that stable flight is possible. If the center of gravity is located above the propeller, a risk of an accident increases due to unstable flight. Accordingly, in the design of the multicopter, even when the power source and the heavy cargo are mounted, it is also required to secure flight stability by locating the center of gravity below the propeller.

SUMMARY

Aspects of one or more exemplary embodiments provide a multicopter which may implement a foldable propeller structure and a simple disassembly structure of respective components, thereby facilitating size reduction, disassembly/assembly, and transport/storage, and may operate in conjunction with next-generation high-efficiency power sources such as lithium-ion batteries or fuel cell power packs, thereby improving a payload value for heavy cargo, enabling the long-time flight, and the like.

Aspects of one or more exemplary embodiments also provide a multicopter which may be configured to allow a propeller to be located above a power source when the propeller is unfolded, thereby removing an obstacle in an air inflow path above the propeller to improve aerodynamic efficiency, and allow the propeller to deviate from a flow range around the power source upon cruising, thereby improving aerodynamic efficiency and improving control stability even upon cruising.

Additional aspects will be set forth in part in the description which follows and, in part, will become apparent from the description, or may be learned by practice of the exemplary embodiments.

According to an aspect of an exemplary embodiment, there is provided a multicopter including: a main body part; a wing part having one end connected to the main body part, and the other end connected to a propeller assembly; and a foldable part disposed on the wing part to fold the wing part, wherein the wing part may be located above the main body part with respect to a Z-axis.

A reference line M1 extending in an X-axis direction with respect to the propeller assembly may be located on the same line as a reference line M2 extending in the X-axis direction with respect to an upper end surface of a power device on the Z-axis or located above the reference line M2.

The wing part may include: a first wing beam having one end connected to the main body part, and the other end connected to the foldable part; and a second wing beam having one end connected to the foldable part, and the other end at which the propeller assembly is disposed, and the foldable part may be disposed between the first and second wing beams, and configured to fold the second wing beam with respect to the first wing beam.

The second wing beam may be folded downward from the first wing beam with respect to the Z-axis.

If a line extending in the X-axis direction with respect to the foldable part is set as an angular reference line L, the second wing beam may have an acute angle α with respect to the first wing beam and may be disposed upward.

The acute angle α formed by the second wing beam may be in a range of 6 to 10° with respect to the first wing beam so that the second wing beam may be located under the first wing beam when folded with respect to the foldable part.

The one end of the first wing beam connected to the main body part may include a first flow hole so that an air introduced from the main body part may flow, the first wing beam may include a first flow space through which the air introduced from the first flow hole may flow, and the other end of the first wing beam connected to the foldable part may include a second flow hole so that the air introduced from the first flow space may flow through the second wing beam.

The one end of the second wing beam connected to the foldable part may include a first flow hole so that the air introduced from the second flow hole of the first wing beam may flow, the second wing beam may include a second flow space through which the air introduced from the first flow hole may flow, and the other end of the second wing beam connected to the propeller assembly may include a second flow hole so that the air introduced from the second flow space may flow through the propeller assembly.

The main body part may include: an air inlet part formed on a lower portion of the main body part and having outside air introduced therein; a flow space of a main body formed inside the main body part so that the air introduced from the air inlet part may flow through the first flow hole of the first wing beam; a communication frame disposed at an edge of the main body part and connected to the first wing beam; and a communication hole formed in the communication frame, communicating with the first flow hole of the first wing beam, and having air flowing therethrough.

The air inlet part may include: an inlet hole disposed in the lower portion of the main body part and having air introduced therein; a blind disposed in the inlet hole to guide a flow direction of the air introduced into the main body part through the inlet hole; and a bent part formed to protrude downward from the lower portion of the main body part to prevent external fluid from entering the inlet hole.

The foldable part may include: a binder disposed between the first and second wing beams so that an unfolded state of the second wing beam with respect to the first wing beam may be fixed, when unfolding the second wing beam.

The binder may include: a first binding block disposed on an end of the first wing beam and configured to include an opening communicating with the second flow hole of the first wing beam; a second binding block disposed on an end of the second wing beam and configured to include an opening communicating with the first flow hole of the second wing beam; a first hinge connecting the first and second binding blocks; and a binding lever connected to a second hinge disposed on the second binding block, wherein the first binding block may include a fixing protrusion, and one side of the binding lever may include a lever handle, and the other side of the binding lever may include a lever protrusion coupled to the fixing protrusion.

The binder may further include: a sealer disposed along the circumference of the opening of the second binding block so that the air flowing along the second flow hole of the first wing beam and the first flow hole of the second wing beam from leaking between the first and second binding blocks when the first and second binding blocks are bound.

A hinge axis reference line S1 formed by the first and second hinges may be formed at an oblique angle θ with respect to a reference line S2 of the second wing beam so that the second wing beam may be located below the first wing beam when folded.

The main body part may be connected to a plurality of first wing beams, each of the other ends of the plurality of first wing beams may include a branch part branched in both directions, and the branch part may be connected to a pair of second wing beams by the binder.

A plurality of propeller assemblies disposed on the other end of the second wing beam around the main body part may be disposed at uniform intervals along the circumferential direction thereof.

The propeller assembly may include: a propeller body connected to the other end of the second wing beam; a motor disposed on an upper portion inside the propeller body; a hub connected to a drive shaft of the motor; a plurality of propellers connected to the hub; and a motor control module supported by a module bracket on a lower portion inside the propeller body, and configured to control the motor.

The propeller assembly may further include: a plurality of radiation ribs formed in a radiation direction around the drive shaft of the motor; curved grooves formed on both side surfaces of each of the plurality of radiation ribs and configured to be curved inward from the propeller body; and opening holes formed on central portions of the curved grooves, wherein when the propeller rotates, the air may flow along the curved groove and may be introduced into the opening hole to cool the motor and the motor control module.

The lower portion of the propeller body may be configured to be inclined outward at a predetermined angle β with respect to the Z-axis so that the air introduced into the opening hole is discharged to be inclined with respect to the Z-axis when discharged to the lower portion of the propeller body after cooling the motor and the motor control module.

A plurality of propeller bodies may be disposed at uniform intervals along the circumferential direction around the main body part, and the air injected downward by the propeller and the air introduced through the air inlet part may be injected to be inclined outward from the lower portion of the propeller body at the predetermined angle β.

If the propeller is driven, a low pressure or negative pressure state may be formed inside the main body part compared to outside atmospheric pressure, and outside air may be introduced into the air inlet part and may air-cool the inside of the main body part.

If the propeller is driven, the air introduced through the air inlet part may pass through the flow space of a main body to flow into the propeller body through the first and second flow spaces, and may be discharged to the lower portion of the propeller body after cooling the motor and the motor control module.

If the propeller is driven, the air may be injected downward by the propeller and form lift, and the air flowing toward the propeller body through the air inlet part may be injected to the lower portion of the propeller body and may form an additional lift.

The main body part may include a leg part seated on a ground, and the leg part may include: a leg beam detachably connected to a lower portion of the main body part with a fastener; and a seating block disposed on a lower end of the leg beam, and seated on the ground.

A lower portion of the main body part may include an equipment detachable part on which an equipment is detached, and a virtual reference line M5 including a center of gravity formed by a weight of the main body part, a weight of the equipment mounted on the equipment detachable part, and a weight of a power device may be formed at a location lower than a reference line M1 including a center of gravity of the propeller assembly with respect to the Z-axis.

An upper portion of the main body part may include a connector which mechanically connects the main body part to an external power source, and electrically connects an electronic device disposed in the main body part to the external power source.

A sensor detachable part may be disposed on the first wing beam.

The main body part and the wing part may be formed in a semi-monocoque structure.

According to the present disclosure, it is possible to configure a plurality of propellers in a foldable manner, and configure respective components in a bolt-fastening method, thereby reducing an overall size of the multicopter to be less than 50%, and to enable disassembly/assembly, thereby facilitating transportation and storage.

In addition, it is possible to operate the multicopter in conjunction with the next-generation high-efficiency power sources such as lithium-ion batteries and fuel cell power packs, thereby improving the payload value for the heavy cargo, and to enable long-term/long-distance flights, thereby transporting the transportation cargo to the desired destination.

In addition, it is possible to configure the propeller above the power source when the propeller is unfolded to configure an overall center of gravity of the multicopter to be located below the propeller, thereby increasing flight stability. That is, the propeller may be located far from the ground upon landing, thereby alleviating an occurrence of turbulence and the like to improve the stability of the landing posture.

In addition, when the propeller is operated, the inside of the multicopter is formed in a relatively low pressure or negative pressure state compared to the outside atmospheric pressure, so that the outside air is introduced to air-cool electronic devices disposed in the multicopter. The introduced outside air may flow to the propeller through the first and second wing beams and air-cool the motor and the motor control module. That is, it is possible to naturally air-cool the electronic devices, the motor, and the motor control module by operating only the propeller.

Further, it is possible to configure the multicopter so that the lift is preferentially generated by the air flowing downward by the propeller, and in addition, the air cooling the inside of the multicopter and induced toward the propeller assembly is injected downward, thereby forming an additional lift to contribute to improving the overall lift of the multicopter.

In addition, it is possible to dispose the plurality of propellers in a radial direction of the multicopter, and form the air injected from the propeller to be injected in the outward inclined direction, thereby being matched to the anti-torque direction. That is, it is possible to generate the thrust in the anti-torque direction in a line direction of the circle connecting eight propellers in the circumferential direction, and to mount the propellers to be inclined according to the anti-torque direction of each propeller, thereby adding the thrust component to the anti-torque for a yaw axis posture control.

Accordingly, the yaw (z) axis posture control of the multicopter is facilitated, thereby increasing flight stability. It is also possible to minimize an interference of the main body and cargo of the multicopter by the air injected downward.

In addition, the multicopter according to the present disclosure may be formed of a waterproof and dustproof structure and material, thereby satisfying an ingress protection (IP) for protecting the electronic devices disposed in the multicopter.

In addition, the structure of the multicopter according to the present disclosure has a semi-monocoque structure having a cell structure to maximize a cross-section coefficient. This is a stressed skin structure, and is formed of a structure in which the skin and a skeleton support the load together as the skin itself supports a part of the load, so that self-structure retention of the multicopter may be excellent and the load may be distributed to the skin and the skeleton even when the transportation cargo is mounted thereon, thereby increasing the fuselage structure retention of the multicopter.

Accordingly, the present disclosure increases commercial operational efficiency of the multicopter type drone.

BRIEF DESCRIPTION OF THE DRAWINGS

The above and other aspects will become more apparent from the following description of the exemplary embodiments with reference to the accompanying drawings, in which:

FIG. 1 is a perspective diagram illustrating a multicopter according to an exemplary embodiment;

FIG. 2 is a plan diagram illustrating the multicopter according to an exemplary embodiment;

FIG. 3 is a side diagram illustrating the multicopter according to an exemplary embodiment;

FIG. 4 is a front diagram illustrating the multicopter according to an exemplary embodiment;

FIG. 5 is a bottom diagram illustrating the multicopter according to an exemplary embodiment:

FIG. 6 is an enlarged diagram illustrating an upper portion of a main body part according to an exemplary embodiment;

FIG. 7 is an enlarged diagram illustrating a lower portion of the main body part according to an exemplary embodiment;

FIG. 8 is a perspective diagram illustrating a propeller assembly according to an exemplary embodiment;

FIG. 9 is a plan diagram illustrating the propeller assembly according to an exemplary embodiment;

FIG. 10 is a side diagram illustrating the propeller assembly according to an exemplary embodiment;

FIG. 11 is a bottom diagram illustrating the propeller assembly according to an exemplary embodiment;

FIG. 12 is a plan diagram illustrating a foldable part according to an exemplary embodiment;

FIG. 13 is a bottom diagram illustrating the foldable part according to an exemplary embodiment;

FIG. 14 is a side cross-sectional diagram illustrating an air circulation path on the main body part and a first wing beam according to an exemplary embodiment;

FIG. 15 is an assembly diagram between the first wing beam and the main body part according to an exemplary embodiment;

FIG. 16 is a side cross-sectional diagram illustrating an air circulation path on a second wing beam and the propeller assembly according to an exemplary embodiment;

FIG. 17 is a perspective diagram illustrating a state in which a wing part is folded in the multicopter according to an exemplary embodiment;

FIG. 18 is a plan diagram illustrating the state in which the wing part is folded in the multicopter according to an exemplary embodiment;

FIG. 19 is a front diagram illustrating the state in which the wing part is folded in the multicopter according to an exemplary embodiment;

FIG. 20 is a side diagram illustrating the state in which the wing part is folded in the multicopter according to an exemplary embodiment;

FIG. 21 is a bottom diagram illustrating the state in which the wing part is folded in the multicopter according to an exemplary embodiment; and FIG. 22 is an enlarged diagram illustrating an air circulation path in the state in which the wing part is folded according to an exemplary embodiment.

DETAILED DESCRIPTION

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a multicopter according to exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a perspective diagram illustrating a multicopter according to an exemplary embodiment, FIG. 2 is a plan diagram illustrating the multicopter according to an exemplary embodiment, FIG. 3 is a side diagram illustrating the multicopter according to an exemplary embodiment, FIG. 4 is a front diagram illustrating the multicopter according to an exemplary embodiment, FIG. 5 is a bottom diagram illustrating the multicopter according to an exemplary embodiment, FIG. 6 is an enlarged diagram illustrating an upper portion of a main body part according to an exemplary embodiment, and FIG. 7 is an enlarged diagram illustrating a lower portion of the main body part according to an exemplary embodiment.

Referring to FIG. 1, a multicopter 100 according to an exemplary embodiment may include a main body part 200, a wing part 300, a foldable part 310, an equipment detachable part 500, and a leg part 400.

In the multicopter 100 according to the exemplary embodiment, the main body part 200 and the wing part 300 may be formed in a semi-monocoque structure having a cell structure to maximize a cross-section coefficient. This is a stressed skin structure, and is formed of a structure in which the skin and a skeleton support a load together as the skin itself supports a part of the load, so that self-structure retention may be excellent and the load may be distributed to the skin and the skeleton even when the transportation cargo is mounted, thereby increasing the fuselage structure retention of the multicopter.

Referring to FIGS. 1 to 5, the main body part 200 may be formed in a housing shape, a predetermined space is formed inside the main body part 200, and various electronic devices for communication and power control may be disposed.

A connector 1000 may be disposed on an upper portion of the main body part 200. The connector 1000 may connect mechanically the upper portion of the main body part 200 to a power source, and may connect electrically various electronic devices disposed inside the main body part 200 to the power source disposed on the upper portion of the main body part 200.

Referring to FIG. 6, the connector 1000 may include a first connector 1100 and a second connector 1200. The first connector 1100 may electrically connect various electronic devices disposed in the main body part 200 to the power source, and the second connector 1200 may mechanically connect the main body part 200 to the power source.

In addition, a main body cover 201 may be disposed in a separated and assembled form by a fastener 201a on the upper portion of the main body part 200. A user may open the main body cover 201 to repair or replace various electronic devices disposed in the main body part 200.

Referring to FIG. 7, a display 610 may be disposed on a lower portion of the main body part 200. The display 610 may display a state of the multicopter 100 through a lighting color. For example, when the multicopter 100 normally operates, the display 610 may display a green color, and when the multicopter 100 is shaken or seriously vibrated, the display 610 may display a yellow color. In addition, when an operational failure such as a voltage drop phenomenon or a sensing malfunction occurs in the electronic devices in the multicopter 100, the display 610 may display a red color. That is, the display 610 may visually inform the user of the current state of the multicopter 100 through colors. However, it is understood that the situations and colors are only examples, and the display 610 may display more various states. Further, the state of the multicopter 100 may be displayed on a controller as well as the display 610.

Referring back to FIGS. 1 to 5, a plurality of wing parts 300 may be connected to and disposed on the main body part 200. One end of the wing part 300 may be connected to the main body part 200, and the other end of the wing part 300 may be connected to a propeller assembly 350.

The foldable part 310 may be formed on the wing part 300 so that the wing part 300 may be folded.

Here, referring to FIG. 3, the wing part 300 may be located above the main body part 200 with respect to a Z-axis. This considers a case of disposing power devices such as a lithium ion battery and a fuel cell power pack on the upper portion of the main body part 200. That is, if the power devices are disposed on the upper portion of the main body part 200, the wing part 300 is located relatively high considering an overall center of gravity.

In addition, a reference line M1 extending in a X-axis direction with respect to the propeller assembly 350 may be located on the same line as a reference line M2 extending in the X-axis direction with respect to an upper end surface of the power source on the Z-axis or located above the reference line M2.

That is, because the propeller assembly 350 which generates lift is located above the upper end surface of the power source, upon flying by the propeller assembly 350, the center of gravity location of the main body part 200 and the power source is formed at a relatively lower height than the center of gravity of the propeller assembly 350, thereby increasing flight stability during flight.

The equipment detachable part 500 is a part in which a photographing equipment, a transportation cargo, and the like may be attached or detached, and may be disposed on the lower portion of the main body part 200. Referring to FIG. 3, a virtual reference line M4 including a center of gravity formed by a weight of the main body part 200, a weight of the equipment detachable part 500, and a weight of an equipment mounted on the equipment detachable part 500 may be formed at a location lower than the reference line M1 including the center of gravity of the propeller assembly 350 with respect to the Z-axis.

Here, as the wing part 300 including the propeller assembly 350 is located above the main body part 200 with respect to the Z-axis, if an equipment is mounted on the equipment detachable part 500, the overall center of gravity is located at a location lower than the center of gravity of the wing part 300, thereby increasing flight stability.

In further detail, a virtual reference line M5 including an integrated center of gravity if the power source is mounted on the upper portion of the main body part 200 and the equipment is mounted on the lower portion of the main body part 200 through the equipment detachable part 500 is located at a location lower than the reference line M1 including the center of gravity of the propeller assembly 350, thereby also improving flight stability.

Here, the virtual reference lines M4 and M5 may be formed at different locations with respect to the Z-axis according to the weight of the power source and the weight of the equipment, but are present at locations lower than the reference line M1 connecting the center of gravity formed by the propeller assembly 350, so that there is no problem.

Referring to FIG. 7, the equipment detachable part 500 may include a fixing plate 510, a connecting rod 520, and a detachable frame 590. The fixing plate 510 may be bolt-fastened and coupled to the lower portion of the main body part 200. A plurality of fixing plates 510 may be disposed, and the connecting rod 520 may be disposed on each of the fixing plates 510. The detachable frame 590 may be inserted and disposed between a pair of connecting rods 520.

It is understood that components of the equipment detachable part 500 are only examples, and may be replaced with other components according to a type of equipment mounted on the equipment detachable part 500.

In addition, the leg part 400 disposed on the lower portion of the main body part 200 may be provided to be stably seated on the ground.

FIG. 8 is a perspective diagram illustrating a propeller assembly according to an exemplary embodiment, FIG. 9 is a plan diagram illustrating the propeller assembly according to an exemplary embodiment, FIG. 10 is a side diagram illustrating the propeller assembly according to an exemplary embodiment, FIG. 11 is a bottom diagram illustrating the propeller assembly according to an exemplary embodiment, FIG. 12 is a plan diagram illustrating a foldable part according to an exemplary embodiment, FIG. 13 is a bottom diagram illustrating the foldable part according to an exemplary embodiment, FIG. 14 is a side cross-sectional diagram illustrating an air circulation path on the main body part and a first wing beam according to an exemplary embodiment, FIG. 15 is an assembly diagram between the first wing beam and the main body part according to an exemplary embodiment, and FIG. 16 is a side cross-sectional diagram illustrating an air circulation path on a second wing beam and the propeller assembly according to an exemplary embodiment.

Referring to FIGS. 3 and 14, the leg part 400 may include a leg beam 410 and a seating block 420. The leg beam 410 may be detachably connected to the lower portion of the main body part 200 with a fastener 410a. The seating block 420 may be made of a pad material such as rubber, urethane, or foamed silicon for a cushioning effect when the multicopter 100 seats on the ground, and may be fixed to a bottom of the leg beam 410 with a fastener 420a.

The user may separate the fastener 410a and detach the leg beam 410 to reduce the size of the multicopter 100 when not operating the multicopter 100 and transporting or storing the multicopter 100. In another form, the leg beam 410 may be coupled to the main body part 200 in a foldable manner through a hinge means.

Referring to FIGS. 12 to 16, the wing part 300 may include a first wing beam 320 and a second wing beam 330.

One end of the first wing beam 320 may be connected to the main body part 200, and the other end of the first wing beam 320 may be connected to the foldable part 310. In addition, one end of the second wing beam 330 may be connected to the foldable part 310, and the other end of the second wing beam 330 may be disposed with the propeller assembly 350.

Referring to FIG. 12, a sensor detachable part 622 may be formed on the first wing beam 320. Various sensors 620 may be coupled to the sensor detachable part 622 in an assembled or separated form by a fastener 620a.

The sensor 620 may be various sensors such as GPS (Global Positioning System), a temperature sensor, a humidity sensor, a dust measurement sensor, and a gas measurement sensor.

For example, when the multicopter 100 is put into a fire site, an infrared device or the like may be installed on the equipment detachable part 500 to search for a life, and a temperature sensor may be coupled to the sensor detachable part 622 to measure an operable temperature of the multicopter 100, an internal temperature of the fire site, and the like.

Alternatively, in a case of cargo transportation, because it is necessary to confirm real-time location information of the multicopter 100, it is possible to confirm a current location of the multicopter 100 by coupling a GPS to the sensor detachable unit 622.

Alternatively, when the multicopter 100 is put into a site in which a hazardous gas leak accident occurs, a photographing equipment or an infrared device may be mounted on the equipment detachable part 500 to search for a life, and a gas measurement sensor may be coupled to the sensor detachable part 622 to detect a type of hazardous gas at the leak accident site and measure the concentration thereof to allow the user to confirm a degree of danger.

The foldable part 310 may be disposed between the first and second wing beams 320, 330, and configured to fold the second wing beam 330 with respect to the first wing beam 320. At this time, if the second wing beam 330 is folded by the foldable part 310, the second wing beam 330 may be configured to be folded downward from the first wing beam 320 with respect to the Z-axis.

FIG. 17 illustrates the multicopter 100 in which the second wing beam 330 is folded with respect to the first wing beam 320. Here, if the second wing beam 330 is folded downward from the first wing beam 320, a size of the multicopter 100 may be further reduced than when the wing part 300 is folded. This may make storage and transportation easier.

Referring to FIG. 3, if a line extending in the X-axis direction with respect to the foldable part 310 is set as an angular reference line L, the second wing beam 330 may have an acute angle α with respect to the first wing beam 320 and may be disposed upward.

Here, the acute angle α formed by the second wing beam 330 with respect to the first wing beam 320 may be in a range of 6 to 10°. The acute angle α may be preferably 8°. As the first and second wing beams 320, 330 form the acute angle within the range of 6 to 10°, if the second wing beam 330 is folded with respect to the foldable part 310, the second wing beam 330 may be located downward from the first wing beam 320.

That is, as the second wing beam 330 forms the acute angle within the range of about 6 to 10° with respect to the first wing beam 320 and is disposed upward, if the second wing beam 330 is unfolded through the foldable part 310, the reference line M1 of the propeller assembly 350 is located above the reference line M2 of the upper end of the power source to be located above the overall center of gravity of the multicopter 100, thereby enabling more stable flight.

In addition, if the second wing beam 330 is folded through the foldable part 310, the second wing beam 330 is located below the first wing beam 320 and the propeller assembly 350 is located below the main body part 200, thereby facilitating storage and transportation upon non-operation.

Referring to FIG. 14, one end of the first wing beam 320 coupled to the main body part 200 may include a 1-1 flowing hole 327 so that the air introduced from the main body part 200 may flow.

In addition, a first flow space 329 through which the air introduced from the 1-1 flow hole 327 flows may be formed in the first wing beam 320.

Further, a 1-2 flow hole 328 may be formed on the other end of the first wing beam 320 coupled to the foldable part 310 so that the air introduced from the first flow space 329 may flow through the second wing beam 330.

Referring to FIG. 15, the first wing beam 320 may be assembled by connecting a fastener 320b and a fastener 200b with a fastener 320a. If the user needs to disassemble the first wing beam 320 to store or transport the multicopter 100, the first wing beam 320 may be easily disassembled by separating the fastener 320a.

The first wing beam 320 may be assembled to a communication frame 237 of the main body part 200 by the fastener 320a, and a communication hole 230 may be formed on a coupling surface 231 of the communication frame 237. The communication hole 230 may communicate with the 1-1 flow hole 327.

Referring to FIG. 16, one end of the second wing beam 330 coupled to the foldable part 310 may include a 2-1 flow hole 337 so that the air introduced from the 1-2 flow hole 328 may flow.

In addition, a second flow space 339 through which the air introduced from the 2-1 flow hole 337 flows may be formed in the second wing beam 330.

Further, a 2-2 flow hole 338 may be formed on the other end of the second wing beam 330 connected to the propeller assembly 350 so that the air introduced from the second flow space 339 may flow through the propeller assembly 350.

Meanwhile, referring to FIGS. 7, 14, and 15, the main body part 200 may include an air inlet part 210, a flow space 220 of the main body, the communication frame 237, and the communication hole 230.

First, referring to FIG. 7, the air inlet part 210 may be a part formed on the lower portion of the main body part 200 and into which outside air is introduced. The air inlet part 210 may include an inlet hole 211, a blind 213, and a bent part 215.

The inlet hole 211 may be formed on the lower portion of the main body part 200 and outside air may be introduced therethrough. Although not illustrated in FIG. 7, an air filter may be disposed in the inlet hole 211 to prevent foreign substances from being introduced.

The blind 213 is disposed in the inlet hole 211 to guide a flow direction of the outside air introduced into the main body part 200 through the inlet hole 211.

The bent part 215 may be formed to protrude downward from the lower portion of the main body part 200 so that external fluid is not introduced into the inlet hole 211. Referring to FIG. 7, the bent part 215 is disposed to protrude downward along an outer circumference of the inlet hole 211. In addition, referring to FIG. 14, the bent part 215 may also protrude inward and upward from the main body part 200, thereby preventing external fluid from being introduced into the main body part 200.

Next, referring to FIG. 14, the flow space 220 of the main body may be formed in the main body part 200 so that the air introduced into the air inlet part 210 may flow through the 1-1 flow hole 327 of the first wing beam 320.

Here, although not illustrated in FIG. 14, various electronic devices capable of operating the multicopter 100 may be disposed in the flow space 220 of the main body, and the outside air introduced through the air inlet part 210 may flow through the 1-1 flow hole 327 after cooling various electronic devices.

Referring to FIG. 15, the communication frame 237 may be a part disposed at an edge of the main body part 200 and connected to the first wing beam 320. Here, four communication frames are disposed in the exemplary embodiment, but it is understood that this is only an example and other exemplary embodiments are not limited thereto.

The communication hole 230 may be formed on the coupling surface 231 of the communication frame 237 and communicate with the 1-1 flow hole 327. The outside air introduced into the flow space 220 of the main body through the air inlet part 210 flows through the 1-1 flow hole 327 through the communication hole 230 after air-cooling the electronic device in the flow space 220 of the main body.

FIG. 18 is a plan diagram illustrating the state in which the wing part is folded in the multicopter according to an exemplary embodiment, FIG. 19 is a front diagram illustrating the state in which the wing part is folded in the multicopter according to an exemplary embodiment, FIG. 20 is a side diagram illustrating the state in which the wing part is folded in the multicopter according to an exemplary embodiment, FIG. 21 is a bottom diagram illustrating the state in which the wing part is folded in the multicopter according to an exemplary embodiment, and FIG. 22 is an enlarged diagram illustrating an air circulation path in the state in which the wing part is folded according to an exemplary embodiment.

Referring to FIGS. 12, 13, and 22, if the second wing beam 330 is unfolded, the foldable part 310 may include a binder 340 disposed between the first and second wing beams 320, 330 so that the unfolded state of the second wing beam 330 with respect to the first wing beam 320 may be fixed.

The binder 340 may include a first binding block 343, a second binding block 344, a first hinge 341, and a binding lever 345.

The first binding block 343 may be disposed on an end of the first wing beam 320, and include an opening communicating with the 1-2 flow hole 328. The second binding block 344 may be disposed on an end of the second wing beam 330, and include an opening communicating with the 2-1 flow hole 337.

A sealer 347 may be disposed around the opening of the second binding block 344. If the second binding block 344 is folded and is in contact with the first binding block 343, the sealing member 347 makes the first and second binding blocks 343, 344 being firmly in close contact to each other so that the air flowing through the 1-2 flow hole 328 and the 2-1 flow hole 337 is prevented from leaking. Here, the sealing member 347 may be foamed silicon in the exemplary embodiment, but it is understood that this is only an example and other exemplary embodiments are not limited thereto.

The first hinge 341 may be provided to connect the first and second binding blocks 343, 344. The first and second binding blocks 343, 344 may be folded and unfolded with respect to the first hinge 341.

The binding lever 345 may be connected to a second hinge 342 disposed on the second binding block 344. The binding lever 345 may rotate by a predetermined range with respect to the second hinge 342.

Here, a fixing protrusion 346 protruding from the first binding block 343 may be formed. In addition, a lever handle 345a may be formed on one side of the binding lever 345, and a lever protrusion 345b bound to the fixing protrusion 346 may be formed on the other side of the binding lever 345.

If the user grips and pushes the lever handle 345a, the fixing between the first and second wing beams 320, 330 is released while the lever protrusion 345b and the fixing protrusion 346 are separated, and the second wing beam 330 may be folded.

Conversely, if the user grasps and pulls the lever handle 345a, the first and second wing beams 320, 330 are fixed while the lever protrusion 345b is bound to the fixing protrusion 346, and the second wing beam 330 may keep the unfolded state.

Here, referring to FIG. 14, if the second wing beam 330 is folded, a hinge axis reference line S1 formed by the first and second hinges 341, 342 may be formed at an oblique angle θ with respect to a reference line S2 of the second wing beam 330 to be located below the first wing beam 320.

Meanwhile, referring to FIGS. 8 to 11 and 16, the propeller assembly 350 may include a propeller body 353, a motor 358, a hub 352, a propeller 351, a motor control module 356, a radiation rib 354, a curved groove 355, and an opening hole 359.

The propeller body 353 may be connected to an outer end of the second wing beam 330, and configured in a cylindrical shape as a whole.

The motor 358 may be disposed on an upper side inside the propeller body 353.

A drive shaft 358a of the motor 358 may be disposed upward, and the hub 352 may be connected to the drive shaft 358a of the motor 358. Here, the hub 352 may have a track shape stretched in a longitudinal direction.

A pair of the propellers 351 may be coupled to both sides of the hub 352 by fasteners 352a, respectively. Referring to FIG. 18, the pair of propellers 351 may be folded with respect to the hub 352. In this case, storage and transportation of the multicopter may be easy.

In addition, the motor control module 356 may be supported by a module bracket 357 on a lower side inside the propeller body 353, and may control the motor 358. That is, the motor control module 356 may control an operation, a stop, a rotation speed, a rotation direction, and the like of the motor 358.

Here, a plurality of radiation ribs 354 may be formed in the radial direction around the drive shaft 358a of the motor 358. The radiation rib 354 may be formed in a shape protruding upward.

In addition, the curved grooves 355 may be formed on both side surfaces of each of the plurality of radiation ribs 354, and formed to be curved inward from the propeller body 353.

The opening holes 359 may be formed in central portions of the curved grooves 355 formed on both side surfaces of the radiation rib 354.

If the propeller 351 rotates to form lift by the structure to flow air downward, air flows along the curved groove 355 and is introduced into the opening hole 359, thereby cooling the motor 358 and the motor control module 356.

Referring to FIG. 3, a lower end of the propeller body 353 may be formed to be inclined outward at a predetermined angle s with respect to the Z-axis so that the air introduced through the opening hole 359 is inclined and discharged with respect to the Z-axis when discharged to the lower portion of the propeller body 353 after cooling the motor 358 and the motor control module 356.

In addition, a plurality of propellers 351 are disposed in the circumferential direction around the main body part 200. For example, in the exemplary embodiment, eight propellers 351 are disposed at relatively uniform intervals along the circumferential direction thereof.

In order for the multicopter 100 to stably keep a fixed location at a specific aerial location during flight, it is advantageous to discharge air Q discharged downward from the eight propellers 351 in the outside inclination direction at the predetermined angle β, respectively when discharged from the lower portion of the propeller 351.

That is, as illustrated in FIG. 3, the eight propellers 351 are uniformly disposed in the circumferential direction around the main body part 200, and the air Q flowing downward by the rotation of the eight propellers 351 is injected to be inclined outward from the lower portion of eight propeller bodies 353, so that the location of the main body part 200 in the air may be fixed at a specific point.

Referring to FIG. 12, a plurality of first wing beams 320 may be connected to the main body part 200. For example, four first wing beams 320 may be connected to four edges of the main body part 200 with the fasteners 320a to be separated and assembled, respectively.

In addition, branch parts 323 which branch in both directions may be formed on each of the other ends of the plurality of first wing beams 320. Accordingly, in the exemplary embodiment, a total of four branch parts 323 may be formed.

A pair of binders 340 may be disposed on the plurality of branch parts 323, and a pair of second wing beams 330 may be connected to the pair of binders 340. Accordingly, in the exemplary embodiment, eight second wing beams 330 may be disposed at relatively uniform intervals.

Accordingly, the propeller assembly 350 disposed on the outer end of the second wing beam 330 around the main body part 200 is disposed at relatively uniform intervals along the circumferential direction thereof, and in the exemplary embodiment, eight propeller assemblies 350 may be disposed.

Hereinafter, the air flow in the multicopter 100 according to the exemplary embodiment is provided.

Referring to FIGS. 14 and 16, when the propeller 351 is operated by driving the motor 358, the air Q inside the propeller body 353 is discharged downward.

The propeller body 353 and the second flow space 339 are in communication with each other, the second flow space 339 and the first flow space 329 are in communication with each other, and the first flow space 329 and the flow space 220 of the main body are in communication with each other by the communication hole 230.

Accordingly, when the propeller 351 is driven, a relatively low pressure or negative pressure state is formed inside the main body part 200 compared to outside atmospheric pressure. As the propeller 351 operates, the air inside the propeller body 353 sucks air while being discharged downward.

Accordingly, the air Q inside the main body part 200 moves along the first and second flow spaces 329, 339 through the communication hole 230 in the flow space 220 of the main body and then is discharged to the lower portion of the propeller body 353.

At this time, because the outside air Q is required to be introduced into the inside of the main body part 200 as much as the escaped air, the outside air is introduced into the air inlet part 210. Because the inside of the main body part 200 is in a relatively low pressure or negative pressure state compared to the outside atmospheric pressure, the outside air is naturally introduced through the air inlet part 210 due to a difference in air pressure.

The air Q introduced through the air inlet part 210 air-cools various electronic devices disposed inside the main body part 200 and passes through the first and second flow spaces 329, 339 to be introduced into the propeller body 353.

In addition, the air cools the motor 358 and the motor control module 356 while being discharged downward from the propeller body 353 according to the rotation of the propeller 351. At this time, as illustrated in FIG. 3, the air Q is discharged in an inclined direction formed at the predetermined angle β.

Further, because the opening hole 359 is formed in the central portion of the radiation rib 354, the air Q flowing downward according to the rotation of the propeller 351 is introduced into the propeller body 353 through the opening hole 359 and air-cools the motor 358 and the motor control module 356.

Such an air flow structure contributes to increasing lift. For example, the lift is first formed by the air flowing downward by the propeller 351, and additional lift is formed by the air which is introduced through the air inlet part 210 at a relatively low pressure or negative pressure and injected into the lower portion of the propeller body 353.

That is, the lift formed by the propeller 351 is further increased, which may lead to an effect of increasing flight stability and power efficiency.

Also, because the plurality of propeller bodies 353 are disposed at uniform intervals along the circumferential direction around the main body part 200, the air injected downward by the propeller 351 and the air introduced through the air inlet part 210 may be injected to be inclined outward from the lower portion of the propeller body 353 at the predetermined angle s, thereby increasing the takeoff/landing stability of the multicopter 100 and suppressing the rotation of the roll and pitch axes to increase flight stability.

That is, the air may be injected to be inclined outward from downward in eight directions around the main body part 200, thereby increasing the takeoff/landing stability of the multicopter and suppressing the rotation of the roll and pitch axes to increase flight stability.

The multicopter 100 according to the exemplary embodiment may configure the plurality of propellers 351 in the foldable manner, and configure respective components in the bolt-fastening manner, thereby reducing the overall size of the multicopter 100, and enabling the disassembling/assembling to facilitate transportation and storage.

In addition, it is possible to operate the multicopter in conjunction with the next-generation high-efficiency power sources such as lithium-ion batteries and fuel cell power packs, thereby improving the payload value for heavy cargo, and enabling the long-term/long-distance flights to transport cargo to the desired destination.

If the propeller 351 is unfolded, the propeller 351 is configured to be located above the power source, so that the overall center of gravity of the multicopter 100 is located on the lower portion of the propeller 351, thereby increasing flight stability.

If the propeller 351 is operated, the inside of the multicopter 100 may be formed in a relatively low pressure or negative pressure state compared to the outside atmospheric pressure, thereby introducing the outside air, and air-cooling various electronic devices disposed inside the multicopter 100. In addition, the introduced outside air may flow to the propeller 351 through the first and second wing beams 320, 330 and air-cool the motor 358 and the motor control module 356. That is, it is possible to naturally air-cool various electronic devices, the motor 358, and the motor control module 356 by operating only the propeller 351.

Accordingly, one or more exemplary embodiments may increase a commercial operational efficiency of the multicopter 100 type drone.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A multicopter comprising:
a main body part;
a wing part having one end connected to the main body part, and other end connected to a propeller assembly; and
a foldable part disposed on the wing part to fold the wing part,
wherein the wing part is located above the main body part in an upward direction of a Z-axis,
wherein the wing part comprises:
a first wing beam having one end connected to the main body part, and other end connected to the foldable part; and
a second wing beam having one end connected to the foldable part, and other end at which the propeller assembly is disposed, and
wherein the foldable part is disposed between the first and second wing beams, and configured to fold the second wing beam with respect to the first wing beam,
wherein the one end of the first wing beam connected to the main body part includes a first flow hole so that an air introduced from the main body part flows,
wherein the first wing beam includes a first flow space through which the air introduced from the first flow hole flows, and
wherein the other end of the first wing beam connected to the foldable part includes a second flow hole so that the air introduced from the first flow space flows through the second wing beam,
wherein the main body part comprises:
an air inlet part formed on a lower portion of the main body part and having outside air introduced into the air inlet part;
a flow space of a main body formed inside the main body part so that the air introduced from the air inlet part flows through the first flow hole of the first wing beam;
a communication frame disposed at an edge of the main body part and connected to the first wing beam; and
a communication hole formed in the communication frame, communicating with the first flow hole of the first wing beam, and having air flowing through the communication hole.

2. The multicopter of claim 1,
wherein a reference line M1 extending in an X-axis direction with respect to the propeller assembly is located on the same line as a reference line M2 extending in the X-axis direction with respect to an upper end surface of a power device on the Z-axis or located above the reference line M2.

3. The multicopter of claim 1,
wherein the second wing beam is folded downward from the first wing beam in a downward direction of the Z-axis.

4. The multicopter of claim 3,
wherein when a line extending in the X-axis direction with respect to the foldable part is set as an angular reference line L, the second wing beam has an acute angle α with respect to the X-axis and is disposed upward.

5. The multicopter of claim 4,
wherein the acute angle α formed by the second wing beam is in a range of 6° to 10° with respect to the X-axis so that the second wing beam is located under the first wing beam when folded with respect to the foldable part.

6. The multicopter of claim 1,
wherein the one end of the second wing beam connected to the foldable part includes a first flow hole so that the air introduced from the second flow hole of the first wing beam flows,
wherein the second wing beam includes a second flow space through which the air introduced from the first flow hole flows, and
wherein the other end of the second wing beam connected to the propeller assembly includes a second flow hole so that the air introduced from the second flow space flows through the propeller assembly.

7. The multicopter of claim 6,
wherein the air inlet part comprises:
an inlet hole disposed in the lower portion of the main body part and having air introduced into the inlet hole;
a blind disposed in the inlet hole to guide a flow direction of the air introduced into the main body part through the inlet hole; and
a bent part formed to protrude downward from the lower portion of the main body part to prevent external fluid from entering the inlet hole.

8. The multicopter of claim 6,
wherein the foldable part comprises a binder disposed between the first and second wing beams so that an unfolded state of the second wing beam with respect to the first wing beam is fixed when unfolding the second wing beam.

9. The multicopter of claim 8,
wherein the binder comprises:
a first binding block disposed on an end of the first wing beam and configured to include an opening communicating with the second flow hole of the first wing beam;
a second binding block disposed on an end of the second wing beam and configured to include an opening communicating with the first flow hole of the second wing beam;
a first hinge connecting the first and second binding blocks; and
a binding lever connected to a second hinge disposed on the second binding block,
wherein the first binding block includes a fixing protrusion, and
wherein one side of the binding lever includes a lever handle, and the other side of the binding lever includes a lever protrusion coupled to the fixing protrusion.

10. The multicopter of claim 9,
wherein the binder further comprises a sealer disposed along a circumference of the opening of the second binding block to prevent the air flowing along the second flow hole of the first wing beam and the first flow hole of the second wing beam from leaking between the first and second binding blocks when the first and second binding blocks are bound.

11. The multicopter of claim 9,
wherein a hinge axis reference line S1 formed by the first and second hinges is formed at an oblique angle θ with respect to a reference line S2 of the second wing beam so that the second wing beam is located below the first wing beam when folded.

12. The multicopter of claim 9,
wherein the main body part is connected to a plurality of first wing beams,
wherein each of the other ends of the plurality of first wing beams includes a branch part branched in both directions, and
wherein the branch part is connected to a pair of second wing beams by the binder.

13. The multicopter of claim 12,
wherein a plurality of propeller assemblies disposed on the other end of the second wing beam around the main body part are disposed at uniform intervals along the circumferential direction of the main body.

14. The multicopter of claim 13,
wherein the propeller assembly comprises:
a propeller body connected to the other end of the second wing beam;
a motor disposed on an upper portion inside the propeller body;
a hub connected to a drive shaft of the motor;
a plurality of propellers connected to the hub; and
a motor control module supported by a module bracket on a lower portion inside the propeller body, and configured to control the motor.

15. The multicopter of claim 14,
wherein the propeller assembly further comprises:
a plurality of radiation ribs formed in a radiation direction around the drive shaft of the motor;
curved grooves formed on both side surfaces of each of the plurality of radiation ribs, and curved inward from the propeller body; and
opening holes formed on central portions of the curved grooves,
wherein when the propeller rotates, the air flows along the curved groove and is introduced into the opening hole to cool the motor and the motor control module.

16. The multicopter of claim 15,
wherein the lower portion of the propeller body is inclined outward at a predetermined angle β with respect to the Z-axis so that the air introduced into the opening hole is discharged to a direction inclined outward with respect to the Z-axis when discharged to the lower portion of the propeller body after cooling the motor and the motor control module.

17. The multicopter of claim 16,
wherein a plurality of propeller bodies are disposed at uniform intervals along the circumferential direction around the main body part, and
wherein the air injected downward by the propeller and the air introduced through the air inlet part are injected to the direction inclined outward with respect to the Z-axis from the lower portion of the propeller body at the predetermined angle β.

18. The multicopter of claim 15,
wherein when the propeller is driven, a low pressure or negative pressure state is formed inside the main body part compared to outside atmospheric pressure, and outside air is introduced into the air inlet part and air-cools the inside of the main body part.

19. The multicopter of claim 18,
wherein when the propeller is driven,
the air introduced through the air inlet part passes through the flow space of a main body to flow into the propeller body through the first and second flow spaces, and is discharged to the lower portion of the propeller body after cooling the motor and the motor control module.

20. The multicopter of claim 19,
wherein when the propeller is driven, the air is injected downward by the propeller and forms lift, and
wherein the air flowing toward the propeller body through the air inlet part is injected to the lower portion of the propeller body and forms an additional lift.

21. The multicopter of claim 1,
wherein the main body part includes a leg part seated on a ground, and
wherein the leg part comprises:
a leg beam detachably connected to a lower portion of the main body part with a fastener; and
a seating block disposed on a lower end of the leg beam, and seated on the ground.

22. The multicopter of claim 1,
wherein a lower portion of the main body part includes an equipment detachable part on which an equipment is detached, and
wherein a virtual reference line M5 comprising a center of gravity formed by a weight of the main body part, a weight of the equipment mounted on the equipment detachable part, and a weight of a power device is formed at a location lower than a reference line M1 comprising a center of gravity of the propeller assembly according to the Z-axis.

23. The multicopter of claim 1,
wherein an upper portion of the main body part includes a connector which mechanically connects the main body part to an external power source, and electrically connects an electronic device disposed in the main body part to the external power source.

24. The multicopter of claim 1,
wherein a sensor detachable part is disposed on the first wing beam.

25. The multicopter of claim 1,
wherein the main body part and the wing part are formed in a semi-monocoque structure.

* * * * *